(12) United States Patent
Tian et al.

(10) Patent No.: US 11,475,412 B2
(45) Date of Patent: Oct. 18, 2022

(54) SYSTEMS AND METHODS FOR FACILITATING A MULTI-MODAL TRANSPORTATION SERVICE

(71) Applicant: Joby Aero, Inc., Santa Cruz, CA (US)

(72) Inventors: Kevin Tian, San Francisco, CA (US); Adam Warmoth, San Francisco, CA (US); Hasrat Godil, Millbrae, CA (US); Nikhil Goel, San Francisco, CA (US); Varun Rau, San Francisco, CA (US); Shabnam Emdadi, San Francisco, CA (US); Raphael Max Lurie, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 49 days.

(21) Appl. No.: 16/838,371

(22) Filed: Apr. 2, 2020

(65) Prior Publication Data
US 2021/0241234 A1   Aug. 5, 2021

Related U.S. Application Data

(60) Provisional application No. 62/969,704, filed on Feb. 4, 2020.

(51) Int. Cl.
*G06Q 10/10* (2012.01)
*G06Q 50/30* (2012.01)
(Continued)

(52) U.S. Cl.
CPC ....... *G06Q 10/1093* (2013.01); *G06Q 10/025* (2013.01); *G06Q 50/30* (2013.01); *H04L 67/34* (2013.01)

(58) Field of Classification Search
None
See application file for complete search history.

(56) References Cited

U.S. PATENT DOCUMENTS

| 2002/0082848 A1* | 6/2002 | Hansen | G06Q 30/02 705/1.1 |
| 2012/0242492 A1* | 9/2012 | Grunfeld | G08B 21/24 340/667 |

(Continued)

FOREIGN PATENT DOCUMENTS

WO   WO 2019/089677   5/2019

OTHER PUBLICATIONS

Ambite, José Luis, et al. "Getting from here to there: Interactive planning and agent execution for optimizing travel." AAAI/IAAI. 2002. (Year: 2002).*

(Continued)

*Primary Examiner* — George Chen
(74) *Attorney, Agent, or Firm* — Dority & Manning, P.A.

(57) ABSTRACT

Systems and methods for facilitating a multi-modal transportation service are provided. The method includes obtaining a request for an aerial transport from a user via user device and generating a multi-modal transportation itinerary for the user to facilitate the aerial transport of the user. The method includes determining a state change indicative of the progress of the user through the transportation service and adjusting an aerial software application running on an aerial device associated with an aerial service provider based on the state change. The method includes determining a subsequent state change occurring after the state change, determining a ground vehicle to provide a ground transportation for the user during another leg of the multi-modal transportation service based on the subsequent state, and adjusting a ground software application running on a ground device associated with the ground vehicle service provider based on the subsequent state change.

15 Claims, 10 Drawing Sheets

(51) Int. Cl.
    *G06Q 10/02*     (2012.01)
    *H04L 67/00*     (2022.01)

(56) References Cited

U.S. PATENT DOCUMENTS

| | | | |
|---|---|---|---|
| 2014/0369570 A1* | 12/2014 | Cheikh | G06Q 10/02 |
| | | | 382/116 |
| 2015/0161554 A1* | 6/2015 | Sweeney | G06Q 10/08355 |
| | | | 705/7.15 |
| 2015/0294238 A1 | 10/2015 | Benque et al. | |
| 2016/0033966 A1* | 2/2016 | Farris | A47G 29/141 |
| | | | 701/15 |
| 2016/0062327 A1* | 3/2016 | Fagan | B64D 11/00153 |
| | | | 700/83 |
| 2017/0197710 A1* | 7/2017 | Ma | B64C 29/0025 |
| 2017/0365029 A1* | 12/2017 | Kim | G06Q 50/30 |
| 2018/0107967 A1* | 4/2018 | Bulcao | G06Q 50/28 |
| 2018/0275661 A1 | 9/2018 | Glaser | |
| 2019/0325757 A1* | 10/2019 | Goel | G08G 5/0013 |
| 2020/0300645 A1* | 9/2020 | Schirano | G01C 21/3423 |

OTHER PUBLICATIONS

International Search Report and Written Opinion for PCT/US20201/012585, dated Mar. 3, 2021, 13 pages.

\* cited by examiner

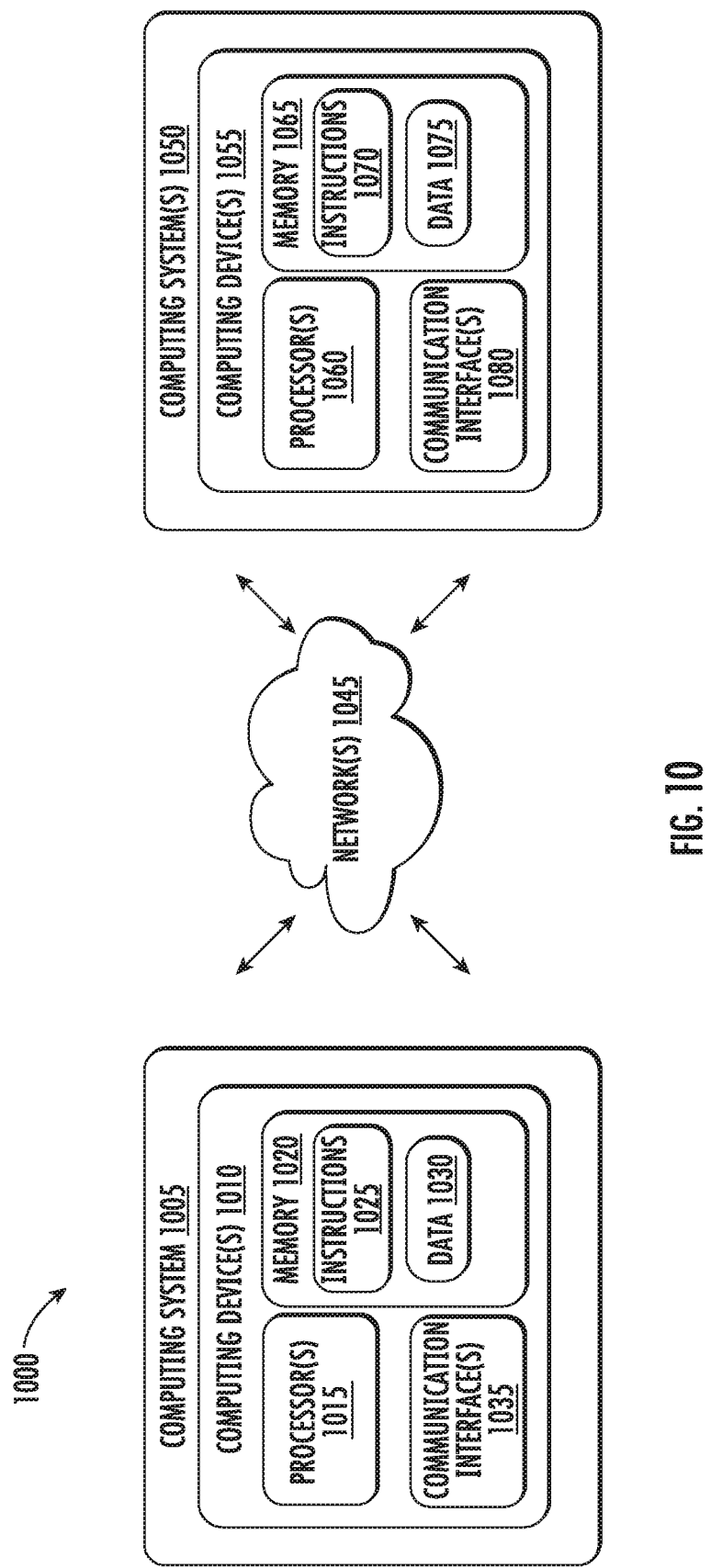

SYSTEMS AND METHODS FOR FACILITATING A MULTI-MODAL TRANSPORTATION SERVICE

RELATED APPLICATION

The present application is based on and claims benefit of U.S. Provisional Patent Application No. 62/969,704 having a filing date of Feb. 4, 2020, which is incorporated by reference herein.

FIELD

The present disclosure relates generally to facilitating state changes at a plurality of devices involved in a multi-modal transportation service in a multi-modal ride sharing network.

BACKGROUND

Transportation services applications exist which enable individual users to request transportation on demand. For example, transportation services currently exist which enable drivers of ground-based vehicle (e.g., "cars") to provide transportation services for potential passengers, as well as to deliver packages, goods, and/or prepared foods. However, certain current services are limited to a single transportation modality, namely transportation via cars, bikes, or scooters. As urban areas become increasingly dense, ground infrastructure such as roadways will become increasingly constrained and congested and, as a result, ground-based transportation may not suitably serve the transportation needs of a significant number of users.

SUMMARY

Aspects and advantages of embodiments of the present disclosure will be set forth in part in the following description, or may be learned from the description, or may be learned through practice of the embodiments.

One example aspect of the present disclosure is directed to a computing system including one or one or more processors and one or more memory devices. The one or more memory devices store instructions that when executed by the one or more processors cause the computing system to perform operations. The operations include obtaining, from a user device, a request for a transportation service that includes at least an aerial transport of a user. The request is generated via a user software application that runs on the user device. The operations include determining an aerial service provider to provide the aerial transport for the user. The operations include generating a multi-modal transportation itinerary for facilitating the aerial transport for the user. The multi-modal transportation itinerary includes at least a first transportation leg, a second transportation leg, and a third transportation leg. The aerial service provider is associated with the second transportation leg to provide the aerial transport to the user during the second transportation leg. The operations include determining an occurrence of a state change of a plurality of state changes associated with the transportation service. Each of the plurality of state changes is indicative of a progress of the transportation service. The operations include adjusting an aerial software application that runs on an aerial device associated with the aerial service provider based at least in part on the state change. The operations include determining an occurrence of a subsequent state change of the plurality of state changes associated with the multi-modal transportation itinerary. The subsequent state change occurs after the state change. The operations include determining a ground vehicle service provider to provide ground transportation for the user during the third transportation leg based, at least in part, on the subsequent state change. And, the operations include adjusting a ground software application that runs on a ground device associated with the ground vehicle service provider based, at least in part, on the subsequent state change. The ground vehicle service provider is to transport the user to a destination location.

Another example aspect of the present disclosure is directed to another computing system. The computing system includes one or more processors and one or more memory devices. The one or more memory devices store instructions that when executed by the one or more processors cause the computing system to perform operations. The operations include obtaining, from a user device, a request for a transportation service that includes at least an aerial transport of a user. The request is generated via a user software application that runs on the user device. The operations include determining an aerial service provider to provide the aerial transport for the user. The operations include determining an occurrence of a state change of a plurality of state changes associated with the transportation service. Each of the plurality of state changes are indicative of a progress of the transportation service. The operations include adjusting an aerial software application that runs on an aerial device associated with the aerial service provider based at least in part on the state change. The operations include generating a multi-modal transportation itinerary, based at least in part on the state change, for facilitating the aerial transport for the user. The itinerary includes at least a first transportation leg, a second transportation leg, and a third transportation leg. The aerial service provider is associated with the second transportation leg to provide the aerial transport to the user during the second transportation leg. The operations include determining the occurrence of a subsequent state change of the plurality of state changes associated with the transportation service. And, the operations include adjusting the aerial software application that runs on the aerial device associated with the aerial service provider based at least in part on the subsequent state change.

Yet another example aspect of the present disclosure is directed to computer-implemented method. The method includes obtaining, by a computing system including one or more computing devices from a user device, a request for a transportation service that includes at least an aerial transport of a user. The request is generated via a user software application that runs on the user device. The method includes determining, by the computing system, an aerial service provider to provide the aerial transport for the user. The method includes generating, by the computing system, a multi-modal transportation itinerary for facilitating the aerial transport for the user. The multi-modal transportation itinerary includes at least a first transportation leg, a second transportation leg, and a third transportation leg. The aerial service provider is associated with the second transportation leg to provide the aerial transport to the user during the second transportation leg. The method includes determining, by the computing system, an occurrence of a state change of a plurality of state changes associated with the transportation service. Each of the plurality of state changes is indicative of a progress of the transportation service. The method includes adjusting, by the computing system, an aerial software application that runs on an aerial device associated with the aerial service provider based at least in part on the state change. The method includes determining, by the computing system, an occurrence of a subsequent state change of the plurality of state changes associated with the multi-modal transportation itinerary. The subsequent state change occurs after the state change. The method includes determining, by the computing system, a ground vehicle service provider to provide ground transportation for the user during the third transportation leg based, at least in part, on the subsequent state change. And, the method includes adjusting, by the computing system, a ground software application that runs on a ground device associated with the ground vehicle service provider based, at least in part, on the subsequent state change. The ground vehicle service provider is to transport the user to a destination location.

Other example aspects of the present disclosure are directed to other systems, methods, vehicles, apparatuses, tangible non-transitory computer-readable media, and devices for generating and communicating aerial vehicle sensory cues.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 10 depicts example system components according to example embodiments of the present disclosure.

DETAILED DESCRIPTION

Figure 1:
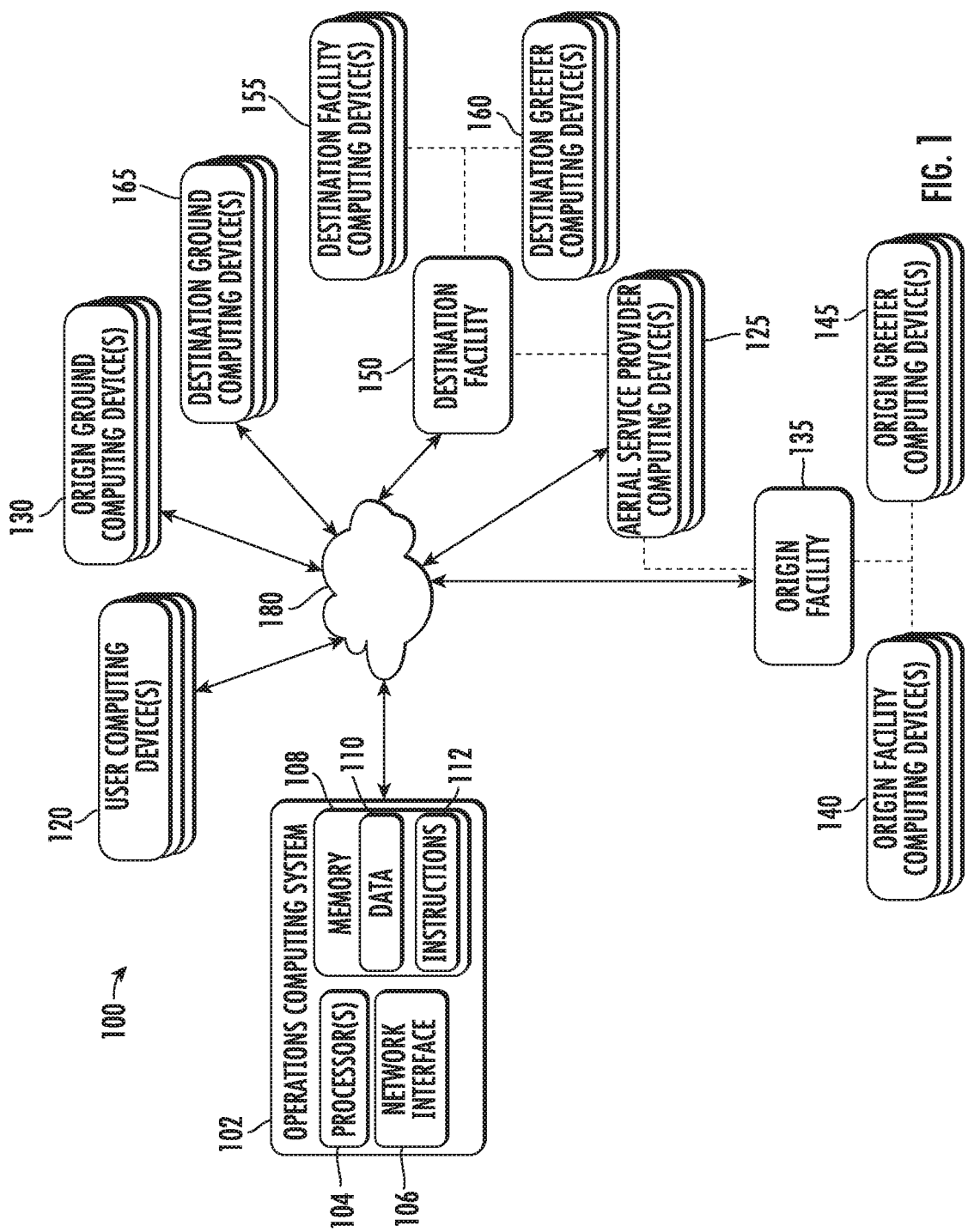
FIG. 1 depicts a block diagram of an example computing system according to example implementations of the present disclosure.

Aspects of the present disclosure are directed to improved systems and methods for pooling a plurality of devices together to facilitate a multi-modal ride sharing network. In particular, aspects of the present disclosure are directed to monitoring the state of a multi-modal transportation service with respect to a plurality of devices (e.g., user device(s), facility device(s), ground device(s), aerial device(s), greeter device(s), etc.) collectively involved in the facilitation of the multi-modal transportation service. For instance, a service entity can manage and coordinate a plurality of different types of vehicles to provide services to a plurality of users via a transportation platform. By way of example, a user may generate a service request for transportation from an origin location to a destination location via an application running on the user's device (e.g., mobile phone, etc.). An operations computing system associated with the service entity (e.g., a cloud-based operations computing system, etc.) can obtain data indicative of the service request and generate a user itinerary to facilitate transporting the user from the origin location to the destination location. The itinerary can be a multi-modal transportation itinerary that includes at least two types of transportation such as, for example, ground-based vehicle transportation and aerial transportation. For example, the itinerary can include three legs: a first leg that includes a ground-based vehicle transporting the user from the origin location (e.g., a home, etc.) to a first aerial transport facility; a second leg (e.g., an aerial portion) that includes an aerial vehicle transporting the user from the first aerial transport facility to a second aerial transport facility; and a third leg that includes another ground-based vehicle transporting the user from the second aerial transport facility to the destination location (e.g., a conference center). Each leg of the itinerary can be serviced by a transportation service provider associated with a different device. For example, a first ground-based vehicle with a first ground device can service the first leg (e.g., a first ground based vehicle transportation), a first aerial vehicle with an aerial device can service the second leg (e.g., an aerial vehicle transportation), and a second ground-based vehicle with a second ground device can service the third leg (e.g., a second ground based vehicle transportation).

The technology of the present disclosure provides an improved approach to pooling the plurality of devices together to facilitate the multi-modal transportation service. For example, the multi-modal transportation service can include a number of states (e.g., initial state, flight assignment state, driver assignment state, leg pick-up/drop-off state(s), checked-in state, etc.) indicative of a progress of the transportation service. Any given state of the transportation service can call for a corresponding state at one or more respective device(s) involved in the transportation service. An operations computing system can monitor the current state (and/or state changes) of the transportation service and initiate a corresponding state at each of the one or more respective device(s) based on the current state of the transportation service. In this way, the systems and methods of the present disclosure can facilitate state changes across a plurality of devices involved in facilitating the transportation service. The resulting state changes at each respective device can communicate interactive real-time information of the multi-modal transportation service tailored to the respective device. This, in turn, can enable the cooperation of the plurality of devices by presenting different information to each device based on the context of the multi-modal transportation service.

More particularly, a service entity can be associated with an operations computing system (e.g., a cloud-based operations computing system, etc.) that is configured to manage, coordinate, and dynamically adjust a multi-modal transportation service via a transportation platform. The multi-modal transportation service can include a plurality of transportation legs, one of which (e.g., a second transportation leg) can include an aerial transport of a user. For example, the operations computing system can obtain a request for a transportation service. The request for the transportation service can include at least a request for an aerial transport of a user of a transportation platform. The operations computing system can obtain the request from a user device associated with the user of the transportation platform.

The request for the transportation service can include an origin location and a destination location. In some instances, unless specified otherwise, the origin of the transportation service can be assumed to be a current location of the first user (e.g., as indicated by location data such as GPS data received from the user device and/or as input by the user). A user can also supply a desired destination (e.g., by typing the destination into a text field which may, for example, provide suggested completed entries while the first user types).

A multi-modal transportation itinerary from the origin location to the destination location can be generated based on the request for the transportation service. The multi-modal transportation itinerary can include two or more transportation legs (e.g., a first transportation leg, a second transportation leg, a third transportation leg, etc.) between the origin location and the destination location specified in the request. The two or more transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can also include helicopters and other vertical take-off and landing aircraft (VTOL) such as electric vertical take-off and landing aircraft (eVTOL). The vehicles can include non-autonomous, semi-autonomous, and/or fully-autonomous vehicles.

The operations computing system can facilitate the ability a user to receive transportation on one or more of the transportation legs included in the itinerary. As an example, the operations computing system can interact with a plurality of device (e.g., one or more service provider devices) to match the user with one or more transportation service providers for each transportation leg of the itinerary. For example, the operations computing system can book or otherwise reserve a seat in, space on, or usage of one or more of the transportation modalities for the user. For example, the request for a transportation service can include at least an aerial transport of the user. In response, the operations computing system can determine an aerial service provider to provide the aerial transport for the user (e.g., book a seat on an aerial vehicle of the aerial service provider).

For example, in response to a user's request, the operations computing system can utilize one or more algorithms/machine-learned models to generate an itinerary for the user. As an example, in some implementations, the operations computing system can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first). By way of example, the operations computing system can assign the first user (and second user) to an aircraft for the middle leg of a three-leg multi-modal itinerary and, then, book a human-driven or autonomous ground-based vehicle for a first leg of the multi-modal itinerary to take the user(s) from an origin location to a first aircraft facility (e.g., to board the aircraft such as, for example, at an origin facility). At a later time (e.g., while the user(s) are in flight), the operations computing system can book another human-driven or autonomous ground-based vehicle to take the user(s) from a second aircraft facility (e.g., a destination facility) to the specified destination location(s).

In this manner, the operations computing system can generate a multi-modal transportation itinerary for facilitating the aerial transportation of the multi-modal transportation service. The multi-modal transportation itinerary can include at least a first transportation leg, a second transportation leg, and a third transportation leg. An aerial service provider, for example, can be associated with the second transportation leg to provide the aerial transport to the user during the second transportation leg.

The multi-modal transportation service can be associated with a plurality of states indicative of the progress of the transportation service. A non-exhaustive list for a multi-modal transportation including a first transportation leg, a second transportation leg, and a third transportation leg can include, for example, an initial state indicating that a request for a transportation service has been received, an aerial assignment state indicating that an aerial service provider has been determined for transportation service, a origin ground assignment state indicating that a ground service provider has been determined for the transportation service, a first leg pick up state indicating that a user has been picked up by the origin ground service provider, a first leg drop off state indicating that a user has been dropped off by the origin ground service provider, a check-in state indicating that a user has checked-in to the second transportation leg, an aerial pick up state indicating that a user has been picked up by the aerial service provider, an approaching facility state indicating that a user is approaching a destination facility, an aerial drop off state indicating that a user has been dropped off by the aerial service provider, a third leg pick up state indicating that a user has been picked up by a second ground service provider, a third leg drop off state indicating that a user has been dropped off by the second ground service provider, etc. Such states are given as examples only and the present disclosure is not limited to the states outlined above. Throughout the disclosure terms such as first, second, third, fourth, etc. states may be used to refer to any state associated with the transportation service. For example, a first state may refer to an initial state at times and a check-in state at other times depending on the context with which it is enumerated. The following description describes a plurality of state changes associated with a multi-modal transportation service. These can be described as state change(s) (e.g., initial state changes) and subsequent state change(s) (e.g., first, second, third subsequent state change(s), etc.), which occur after the state change (e.g., after an initial state change).

The multi-modal transportation service can pool together a plurality of devices to facilitate the multi-modal transportation service. For example, each transportation leg can be associated (e.g., facilitated by, performed by, etc.) with one or more of the plurality of devices. For instance, a multi-modal transportation service including three transportation legs can be associated with a plurality of devices including a user device (e.g., associated with each leg in the multi-modal transportation service) associated with a user of the transportation service, one or more ground vehicle service provider device(s) (e.g., an origin ground device associated with the first transportation leg, a destination ground device associated with the third transportation leg), an aerial device (e.g., associated with the second transportation leg) associated with an aerial service provider, and one or more greeter device(s) (e.g., an origin greeter device, destination greeter device, etc.) and facility device(s) (e.g., an origin facility device, destination facility device, etc.) associated with one or more greeter service providers and facility service providers, respectively. The operations computing system can pool together the plurality of devices by initiating state changes at each respective device based on the current state (and/or state change) associated with the multi-modal transportation service.

By way of example, the request for a transportation service can be obtained from a user associated with a multi-modal transportation platform. The user can be associated with a user device (e.g., smartphone, tablet, hand-held computing device, wearable computing device, embedded computing device, navigational computing device, etc.). The user device can include a user software application that runs on the user device and, in some implementations, the request for the transportation service can be generated via the user software application. The operations computing system can initiate one or more states at the user device during the transportation service. For example, the operations computing system can initiate one or more states on the user device, via the user software application, based on the current state (and/or a state change) of the transportation service.

In addition, in some implementations, the multi-modal transportation service can be associated with one or more ground service provider device(s). For example, the multi-modal transportation service can be associated with an origin ground device associated with a first transportation leg of the multi-modal transportation service and a destination ground device associated with a third transportation leg of the multi-modal transportation service.

The origin ground device, for example, can be associated with a ground vehicle service provider. For instance, the origin ground device can include a vehicle operations computing system associated with an autonomous ground vehicle, a driver computing device/user device associated with a driver of a ground vehicle, etc. The origin ground device can include an origin ground software application that runs on the origin ground device. The operations computing system can initiate one or more states at the origin ground device during the transportation service (e.g., before, during, or after the first transportation leg). For example, the operations computing system can initiate one or more states on the origin ground device, via the origin ground software application, based on the current state (and/or a state change) of the transportation service.

The destination ground device can include a different device than the origin ground device. For example, the destination ground device can be associated with a destination ground vehicle service provider. For instance, the destination ground device can include a second vehicle operations computing system associated with a second autonomous ground vehicle, a second driver computing device/user device associated with a second driver of the second ground vehicle, etc. The destination ground device can include a destination ground software application that runs on the destination ground device. In some implementations, the destination ground software application and the origin ground software application can include the same application running on different device(s) (e.g., the destination ground software application includes the application running of the destination ground device, the origin ground software application includes the same application running on the origin ground device). In addition, or alternatively, the destination ground software application and the origin ground software application can include distinct applications running on each device. The operations computing system can initiate one or more states at the destination ground device during the transportation service (e.g., before, during, or after the third transportation leg). For example, the operations computing system can initiate one or more states on the destination ground device, via the destination ground software application, based on the current state (and/or a state change) of the transportation service.

In addition, in some implementations, the multi-modal transportation service can be associated with an aerial device. For example, the aerial device can be associated with an aerial service provider associated with a second transportation leg of the multi-modal transportation service. For instance, the aerial service provider device can include an aerial vehicle operations computing system onboard an aerial vehicle, a pilot computing device associated with a pilot of the aerial vehicle, etc. The aerial device can include an aerial software application that runs on the aerial device. The operations computing system can initiate one or more states at the aerial device during the transportation service (e.g., before, during, or after the second transportation leg). For example, the operations computing system can initiate one or more states on the aerial device, via the aerial software application, based on the current state (and/or a state change) of the transportation service.

Additionally, the multi-modal transportation service can be associated with one or more greeter devices and/or facility devices. Each greeter and/or facility device can be associated with an origin facility and/or destination facility for an aerial service provider (e.g., an aerial service provider can provide aerial transport between an origin facility and a destination facility). By way of example, the multi-modal transportation service can be associated with an origin greeter device associated with a greeter (e.g., a person/operations computing system for directing user(s) at the facility) at the origin facility and an origin facility device associated with the origin facility (e.g., a person/operations computing system for checking a user in at the facility). In addition, the multi-modal transportation service can be associated with a destination greeter device associated with a greeter at the destination facility and/or a destination facility device associated with the destination facility.

Thus, the origin greeter device can be associated with the origin facility of the aerial service provider and the destination greeter device can be associated with the destination facility of the aerial service provider. For instance, the origin/destination greeter device(s) can include a greeter operations computing system configured to direct a user at the origin/destination facility, a greeter user device associated with a human greeter at the origin/destination facility, etc. The origin/destination greeter device(s) can include an origin greeter software application that runs on the origin greeter device and/or a destination greeter software application that runs on the destination greeter device. The origin greeter software application and the destination greeter software application can include the same application running on different device(s) (e.g., the destination greeter software application includes the application running on the destination greeter device, the origin greeter software application includes the same application running on the origin greeter device). In addition, or alternatively, the destination greeter software application and the origin greeter software application can include distinct applications running on each device. The operations computing system can initiate one or more states at the origin/destination greeter devices during the transportation service (e.g., before, during, or after the second transportation leg). For example, the operations computing system can initiate one or more states on the origin/destination greeter device(s), via the respective software application, based on the current state (and/or a state change) of the transportation service.

Additionally, the origin facility device can be associated with the origin facility of the aerial service provider and the destination facility device can be associated with the destination facility of the aerial service provider. For instance, the origin/destination facility device(s) can include an origin operations computing system configured to check in a user at the origin/destination facility, a facility device usable by a human to check in a user at the origin/destination facility, etc. The origin/destination facility device(s) can include an origin facility software application that runs on the origin facility device and/or a destination facility software application that runs on the destination facility device. The origin facility software application and the destination facility software application can include the same application running on different device(s) (e.g., the destination facility software application includes the application running on the destination facility device, the origin facility software application includes the same application running on the origin facility device). In addition, or alternatively, the destination facility software application and the origin facility software application can include distinct applications running on each device. The operations computing system can initiate one or more states at the origin/destination facility devices during the transportation service (e.g., before, during, or after the second transportation leg). For example, the operations computing system can initiate one or more states on the origin/destination facility device(s), via the respective software application, based on the current state (and/or a state change) of the transportation service.

The operations computing system can monitor the transportation service to determine the occurrence of one or more state changes of a plurality of state changes associated with the transportation service. For example, each of the plurality of state changes can be indicative of a progress of the transportation service (e.g., a transition from one state of the transportation service to another). For example, the operations computing system can determine the occurrence of a first state change indicative of a transition to an initial state. For example, the transportation can transition to an initial state in response to receiving a request for the transportation service. The operations computing system can adjust the user software application based on the state change. For example, the operations computing system can determine a first user state change for the user software application based on the state change. The first user state change can include, for example, an indication that the user has requested the transportation service. The operations computing system can communicate data to the user device to implement the first user state change within the user software application.

The operations computing system can determine the occurrence of a second state change indicative of a transition from the initial state to an aerial assignment state. The second state change can occur, for example, in response to determining the aerial service provider to provide the aerial transport for the user. For example, the operations computing system can identify an aerial service provider (e.g., an aerial vehicle, a seat assignment for the aerial vehicle, etc.) for the transporting the user during the second leg of the multi-modal service (e.g., from the origin facility to the destination facility). The operations computing system can adjust the aerial software application associated with the aerial service provider based on the second state change. For example, the operations computing system can determine a first aerial state change for the aerial software application that runs on the aerial device of the aerial service provider. The first aerial state change can include an indication that the user has been assigned to the aerial service provider. For example, the first aerial state change can include a list of passengers for an aerial transportation service. The list of passengers can include, for example, user information (e.g., username, baggage info, etc.) The operations computing system can communicate data to the aerial device to implement the first aerial state change within the aerial software application (e.g., to change a user interface from an empty, incomplete, etc. passenger manifest to display the list of passengers).

The operations computing system can determine the occurrence of a third state change indicative of a transition from the aerial assignment state to an origin ground assignment state. The third state change can occur, for example, in response to determining the origin ground service provider to provide ground transportation for the user during the first transportation leg of the multi-modal transportation itinerary. For example, the operations computing system can identify an origin ground service provider for transporting the user during the first leg of the multi-modal service (e.g., from the user's requested origin location to the origin facility). The operations computing system can adjust the origin ground software application associated with the origin ground service provider based on the third state change. For example, the operations computing system can determine a first origin ground state change for the origin ground software application that runs on the origin ground device of the origin ground service provider. The first origin ground state change can include an indication that the user has been assigned to the origin ground service provider. For example, the first origin ground state change can include information about the user (e.g., username, user location, preferences, etc.) and the itinerary (e.g., timing data (e.g., preferred arrival time), destination facility, origin location, etc.). The operations computing system can communicate data to the origin ground device to implement the first origin ground state change within the origin ground software application (e.g., to display the user information).

In addition, or alternatively, the operations computing system can adjust the user software application based on the third state change. For example, the operations computing system can determine a second user state change for the user software application. By way of example, the second user state change can include an indication that the user has been assigned to the origin ground service provider (e.g., assignment confirmation) and/or information for the assignment (e.g., a driver name, vehicle type, location, rating, etc.). The operations computing system can communicate data to the user device to implement the second user state change (e.g., by displaying the confirmation, assignment information, etc.) within the user software application. In this manner, both the user and the origin ground service provider can obtain data indicative of the assignment of the origin ground service provider.

The operations computing system can determine the occurrence of a fourth state change indicative of a transition from the origin ground assignment state to a first leg pick-up state. The fourth state change can occur, for example, in response to determining that the origin ground service provider has picked-up the user for the first transportation leg of the multi-modal transportation itinerary. The operations computing system can adjust the origin ground software application based on the fourth state change. For example, the operations computing system can determine a second origin ground state change for the origin ground software application. The second origin ground state change can include an indication that the user has been picked-up by the origin ground service provider (e.g., a pick-up confirmation, etc.). The operations computing system can communicate data to the origin ground device to implement the second origin ground state change (e.g., by displaying the pick-up confirmation, etc.) within the origin ground software application.

In addition, or alternatively, the operations computing system can adjust the user software application based on the fourth state change. For example, the operations computing system can determine a third user state change for the user software application. By way of example, the third user state change can include an indication that the user has been picked up by the origin ground service provider (e.g., a pick-up confirmation). The operations computing system can communicate data to the user device to implement the third user state change (e.g., by displaying the pick-up confirmation) within the user software application.

Additionally, in some implementations, the operations computing system can adjust the origin greeter software application running on the origin greeter device associated with the origin facility based on the fourth state change. For example, the operations computing system can determine a first origin greeter state change for the origin greeter software application. The first origin greeter state change, for example, can include an indication that the user has been picked up by the origin ground service provider (e.g., a pick-up confirmation, a user inbound notification, etc.). The operations computing system can communicate data to the origin greeter device to implement the first origin greeter state change (e.g., by displaying the pick-up confirmation, the inbound notification, etc.) within the origin greeter software application.

In addition, in some implementations, the operations computing system can adjust the origin facility software application running on the origin facility device associated with the origin facility based on the fourth state change. For example, the operations computing system can determine a first origin facility state change for the origin facility software application. The first origin facility state change, for example, can include an indication that the user has been picked up by the origin ground service provider (e.g., a pick-up confirmation, a user inbound notification, etc.). The operations computing system can communicate data to the origin facility device to implement the first origin facility state change (e.g., by displaying the pick-up confirmation, the inbound notification, etc.) within the origin facility software application.

The operations computing system can determine the occurrence of a fifth state change indicative of a transition from the first leg pick up state to a first leg drop off state. The fifth state change can occur, for example, in response to determining that the origin ground service provider has dropped off the user at the origin facility. The operations computing system can adjust the origin ground software application associated with the origin ground service provider based on the fifth state change. For example, the operations computing system can determine a third origin ground state change for the origin ground software application. The third origin ground state change can include an indication that the user has been dropped off by the origin ground service provider (e.g., a drop off confirmation, a trip summary, etc.). The operations computing system can communicate data to the origin ground device to implement the third origin ground state change (e.g., by displaying the confirmation, the trip summary, etc.) within the origin ground software application.

In addition, or alternatively, the operations computing system can adjust the user software application based on the fifth state change. For example, the operations computing system can determine a fourth user state change for the user software application. The fourth user state change can include an indication that the user has been dropped off up by the origin ground service provider (e.g., a drop off confirmation, a trip summary, etc.). The operations computing system can communicate data to the user device to implement the fourth user state change (e.g., by displaying the confirmation, the trip summary, etc.) within the user software application.

Additionally, in some implementations, the operations computing system can adjust the origin greeter software application based on the fifth state change. For example, the operations computing system can determine a second origin greeter state change for the origin greeter software application. The second origin greeter state change, for example, can include an indication that the user has been dropped off by the origin ground service provider (e.g., a drop off confirmation, a user arrival notification, etc.). The operations computing system can communicate data to the origin greeter device to implement the second origin greeter state change (e.g., by displaying the drop off confirmation, the arrival notification, etc.) within the origin greeter software application.

In addition, in some implementations, the operations computing system can adjust the origin facility software application based on the fifth state change. For example, the operations computing system can determine a second origin facility state change for the origin facility software application. The second origin facility state change, for example, can include an indication that the user has been dropped off by the origin ground service provider (e.g., a drop off confirmation, a user arrival notification, etc.). The operations computing system can communicate data to the origin facility device to implement the second origin facility state change (e.g., by displaying the drop off confirmation, arrival notification, etc.) within the origin facility software application. In this manner, the user, the origin ground service provider, the origin greeter, and the origin facility (e.g., a human operator associated therewith) can all, independently, obtain data indicative of the progress of the first transportation leg of the multi-modal transportation itinerary.

The operations computing system can determine the occurrence of a sixth state change indicative of a transition from the first leg drop off state to a check-in state. The sixth state change can occur, for example, in response to obtaining check-in data from the user (e.g., via the user device, the origin facility device, etc.). The operations computing system can adjust the user software application based on the sixth state change. For example, the operations computing system can determine a fifth user state change for the user software application. The fifth user state change can include an indication that the user has completed a checked-in operation for the second transportation leg (e.g., a boarding pass indicative of the second transportation leg, etc.). The operations computing system can communicate data to the user device to implement the fifth user state change within the user software application. For example, to implement the fifth user state change within the user software application, a user interface of the user software application can be adjusted to reflect the fifth user state change. By way of example, the user interface of the user software application can be adjusted to display boarding pass information associated with the aerial transport and/or the user.

Additionally, in some implementations, the operations computing system can adjust the aerial software application on the sixth state change. For example, the operations computing system can determine a second aerial state change for the aerial software application. The second aerial state change can include an indication that the user has completed a check-in operation for the second transportation leg (e.g., a check-in confirmation, etc.). The operations computing system can communicate data to the aerial device to implement the second aerial state change within the aerial software application. For example, to implement the second aerial state change within the aerial software application, a user interface of the aerial software application can be adjusted to reflect the second aerial state change (e.g., the check-in status of the user).

In addition, in some implementations, the operations computing system can adjust the origin facility software application based on the sixth state change. For example, the operations computing system can determine a third origin facility state change for the origin facility software application. The third origin facility state change, for example, can include an indication that the user has completed a check-in operation for the second transportation leg (e.g., a check-in confirmation, etc.). The operations computing system can communicate data to the origin facility device to implement the third origin facility state change (e.g., by displaying the check-in confirmation) within the origin facility software application.

The operations computing system can determine the occurrence of a seventh state change indicative of a transition from the check-in state to an aerial pick up state. The seventh state change can occur, for example, in response to the user boarding an aerial vehicle of the aerial service provider (e.g., at the start of the second transportation leg). The operations computing system can adjust the user software application based on the seventh state change. For example, the operations computing system can determine a sixth user state change for the user software application. The sixth user state change can include an indication that the user has boarded an aerial vehicle for the aerial transport of the second transportation leg (e.g., a pick-up confirmation, a safety video, etc.). The operations computing system can communicate data to the user device to implement the sixth user state change (e.g., by displaying the pick-up confirmation, playing the safety video, etc.) within the user software application. For example, to implement the sixth user state change within the user software application, a user interface of the user software application can be adjusted to reflect the sixth user state change. By way of example, the user interface of the user software application can be adjusted to display a confirmation that the user has boarded the correct aerial vehicle of the aerial transportation service.

Additionally, in some implementations, the operations computing system can adjust the aerial software application based on the seventh state change. For example, the operations computing system can determine a third aerial state change for the aerial software application. The third aerial state change can include an indication that the user has boarded the aerial vehicle for the aerial transport of the second transportation leg (e.g., a user boarding confirmation, etc.). The operations computing system can communicate data to the aerial device to implement the third aerial state change (e.g., by displaying the confirmation, etc.) within the aerial software application. For example, to implement the third aerial state change within the aerial software application, a user interface of the aerial software application can be adjusted to reflect the third aerial state change (e.g., a confirmation that the user has boarded).

In addition, in some implementations, the operations computing system can adjust a destination facility software application running on a destination facility device based on the seventh state change. For example, the operations computing system can determine a first destination facility state change for the destination facility software application. The first destination facility state change can include an indication that the user has boarded the aerial vehicle for the aerial transport to a destination facility associated with the destination facility device (e.g., a user assignment confirmation, etc.). The operations computing system can communicate data to the destination facility device to implement the first destination facility state change within the destination facility software application. For example, to implement the first destination facility state change within the destination facility software application, a user interface of the destination facility software application can be adjusted to reflect the first destination facility state change (e.g., a confirmation that the user has boarded a flight inbound to the destination facility).

The operations computing system can determine the occurrence of an eighth state change indicative of a transition from the aerial pick up state to an approaching facility state. The eighth state change can occur, for example, in response to the aerial vehicle approaching the destination facility. For example, the eighth state change can be triggered when the aerial vehicle reaches a threshold distance from the destination facility and/or the origin facility. The threshold distance, for example, can include an optimal distance (and/or time) to schedule ground transportation for the third transportation leg. In some implementations, the operations computing system can determine a destination ground vehicle service provider to provide ground transportation for the user during the third transportation leg based on the occurrence of the eighth state change.

The operations computing system can adjust a destination ground software application running on a destination ground device associated with the destination ground vehicle service provider based on the eighth state change. For example, the operations computing system can identify a destination ground service provider for transporting the user during the third leg of the multi-modal service (e.g., from the destination facility to the user' requested destination). The operations computing system can determine a first destination ground state change for the destination ground software application. The first destination ground state change can include an indication that the destination ground service provider has been assigned to transport the user from the destination facility to a destination location. The operations computing system can communicate data to the destination ground device to implement the first destination ground state change within the destination ground software application. For example, to implement the first destination ground state change within the destination ground software application, a user interface of the destination ground software application can be adjusted to reflect the first destination ground state change (e.g., an indication of the assignment, user information, a destination location, etc.).

In addition, in some implementations, the operations computing system can adjust a destination greeter software application running on a destination greeter device associated with a destination greeter at the destination facility based on the eighth state change. For example, the operations computing system can determine a first destination greeter state change for the destination greeter software application. The first destination greeter state change can include an indication that the user is approaching the destination facility (e.g., a user inbound notification, etc.). The operations computing system can generate first destination greeter state change data based on the first destination greeter state change and communicate the data to the destination greeter device. The destination greeter device can receive the first destination greeter state change data and implement the first destination greeter state change, for example, by displaying a user inbound notification, etc. within the destination greeter software application as indicated by the first destination greeter state change data. For example, to implement the first destination greeter state change within the destination greeter software application, a user interface of the destination greeter software application can be adjusted to display the user inbound notification.

The operations computing system can determine the occurrence of a ninth state change indicative of a transition from the approaching facility state to an aerial drop off state. The ninth state change can occur, for example, in response to the aerial service provider dropping off the user at the destination facility (e.g., at the completion of the second transportation leg). The operations computing system can adjust the destination greeter software application based on the ninth state change. For example, the operations computing system can determine a second destination greeter state change for the destination greeter software application. The second destination greeter state change can include an indication that the user has arrived at the destination facility (e.g., the second transportation leg destination). The operations computing system can communicate data to the destination greeter device to implement the second destination greeter state change within the destination greeter software application. For example, to implement the second destination greeter state change within the destination greeter software application, a user interface of the destination greeter software application can be adjusted to reflect the second destination greeter state change.

Additionally, in some implementations, the operations computing system can adjust the aerial software application based on the ninth state change. For example, the operations computing system can determine a fourth aerial state change for the aerial software application. The fourth aerial state change can include an indication that the aerial vehicle has reached the destination facility (e.g., a trip summary, a drop off confirmation, etc.). The operations computing system can communicate data to the aerial device to implement the fourth aerial state change (e.g., by displaying the trip summary, the drop off confirmation, etc.) within the aerial software application. For example, to implement the fourth aerial state change within the aerial software application, a user interface of the aerial software application can be adjusted to reflect the fourth aerial state change (e.g., a confirmation the vehicle has landed, etc.).

In some implementations, the operations computing system can adjust the user software application based on the ninth state change. For example, the operations computing system can determine a seventh user state change for the user software application. The seventh user state change can include an indication that the aerial vehicle has reached the destination facility (e.g., a notification that the aerial vehicle has landed, a drop off confirmation, a notification that a third leg vehicle has been assigned, etc.). The operations computing system can communicate data to the user device to implement the seventh user state change (e.g., by displaying the drop off confirmation, a trip summary, information for the next leg of the itinerary, etc.) within the user software application. For example, to implement the seventh user state change within the user software application, a user interface of the user software application can be adjusted to reflect the seventh user state change (e.g., a confirmation the vehicle has landed, etc.). By way of example, the user interface of the user software application can be adjusted to display a notification that the second transportation leg has ended. In addition, or alternatively, the user interface of the user software application can be adjusted to display a notification that the ground transportation for the third transportation leg has been assigned to transport the user from the destination facility to a destination location. For example, to implement the seventh user state change within the user software application, a user interface of the user software application can be adjusted to reflect information about the third transportation leg assignment (e.g., an indication of the assignment, driver information, the destination location, user pick-up location, etc.).

Although an enumerated set of example state changes are provided above, the operations computing system can determine the occurrence of any number of state changes indicative of the progress of the transportation service. In response to each state change, the operations computing system can determine additional state changes at each respective device associated with the transportation service. For example, the operations computing system can determine the occurrence of a tenth state change indicative of a transition from the aerial drop off state to a third leg pick up state. In response, the operations computing system can determine respective state changes at one or more devices such as the destination ground device, the destination greeter device, the user device, etc. Moreover, the operations computing system can determine the occurrence of an eleventh state change indicative of a transition from the third leg pick up state to the third leg drop off state. In response, the operations computing system can determine respective state changes at one or more devices such as the destination ground device, the user device, etc.

Example aspects of the present disclosure can provide a number of improvements to transportation service computing technology such as, for example, multi-modal transportation computing technology. For instance, the systems and methods of the present disclosure provide an improved approach for utilizing a plurality of devices to collectively facilitate a transportation service. For example, a computing system can obtain a request for a transportation service that includes at least an aerial transport of a user from a user device associated with the user. The computing system can determine an aerial service provider to provide the aerial transport of the user. The computing system can generate a transportation itinerary with a first, second, and third transportation leg with the aerial service provider associated with the second transportation leg. The computing system can determine an occurrence of a first state change of a plurality of state changes associated with the transportation service indicative of a progress of the transportation service. The computing system can adjust the aerial software application that runs on the aerial device associated with the aerial service provider based on the first state change. In addition, the computing system can determine an occurrence of a second state change of the plurality of state changes. In response, the computing system can determine a ground vehicle service provider to service the third transportation leg and adjust a ground vehicle provider software application that runs on a ground device of the ground vehicle service provider. In this manner, the present disclosure presents an improved computing system that can effectively monitor the progress of a transportation service and interact with a plurality of devices associated with the transportation service based on the progress. For example, the computing system employs improved user interfaces at each of the plurality of devices that accept new data indicative of state changes from the computing system and adjust in response to the accepted data. As a result, the computing system can accumulate and distribute newly available information such as, for example, a plurality of states (and/or state changes) associated with the multi-modal transportation service. In this way, the computing system provides a practical application that enables the pooling of a plurality of devices to better facilitate transportation services.

Thus, aspects of the present disclosure are directed to systems and methods for facilitating a multi-modal transportation service. The systems and methods efficiently interact with various devices associated with the multi-modal transportation to ensure a seamless and timely multi-modal experience for a rider.

With reference now to the FIGS. 1-10, example embodiments of the present disclosure will be discussed in further detail.

FIG. 1 depicts a block diagram of an example computing system 100 according to example implementations of the present disclosure. The computing system 100 includes an operations computing system 102 (e.g., a cloud-based operations computing system, etc.) that can operate to plan and fulfill multi-modal transportation service itineraries. The operations computing system 102 can be communicatively connected over a network 180 to one or more user computing devices 120, one or more aerial computing device(s) 125, one or more origin ground computing device(s) 130, one or more origin facility computing device(s) 140, one or more origin greeter computing device(s) 145, one or more destination facility computing device(s) 155, and one or more destination greeter computing device(s) 160.

Each of the computing devices 120, 125, 130, 140, 145, 155, 160 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 104 and memory 108).

The operations computing system 102 includes one or more processors 104 and a memory 108. The one or more processors 104 can be any suitable processing device (e.g., a processor core, a microprocessor, an ASIC, a FPGA, a controller, a microcontroller, etc.) and can be one processor or a plurality of processors that are operatively connected. The memory 108 can include one or more non-transitory computer-readable storage media, such as RAM, ROM, EEPROM, EPROM, one or more memory devices, flash memory devices, etc., and combinations thereof.

The memory 108 can store information that can be accessed by the one or more processors 104. For instance, the memory 108 (e.g., one or more non-transitory computer-readable storage mediums, memory devices) can store data 110 that can be obtained, received, accessed, written, manipulated, created, and/or stored. In some implementations, the operations computing system 102 can obtain data from one or more memory device(s) that are remote from the system 102.

The memory 108 can also store computer-readable instructions 112 that can be executed by the one or more processors 104. The instructions 112 can be software written in any suitable programming language or can be implemented in hardware. Additionally, or alternatively, the instructions 112 can be executed in logically and/or virtually separate threads on processor(s) 104. For example, the memory 108 can store instructions 112 that, when executed by the one or more processors 104, cause the one or more processors 104 to perform any of the operations and/or functions described herein.

In some implementations, the operations computing system 102 can facilitate the ability of the user to receive transportation on one or more of the transportation legs included in an itinerary. As one example, the operations computing system 102 can interact with one or more ride-sharing networks to match the user with one or more transportation service providers associated with one or more computing device(s) 125, 130, 155, 160, 165. As another example, the operations computing system 102 can book or otherwise reserve a seat in, space on, or usage of one or more of the transportation modalities for the user. Additionally, or alternatively, the operations computing system 102 can simply provide information for options to be provided by one or more third parties for one or more of the transportation legs.

More particularly, the operations computing system 102 can be associated with a service entity configured to manage, coordinate, and dynamically adjust a multi-modal transportation service via a transportation platform of the service entity. The multi-modal transportation service can include a plurality of transportation legs, one of which (e.g., a second transportation leg) can include an aerial transport of a user. For example, the operations computing system 102 can obtain a request for a transportation service. The request for the transportation service can include at least a request for an aerial transport of a user of a transportation platform. The operations computing system 102 can obtain the request from a user computing device (e.g., one or more user computing device(s) 120) associated with the user of the transportation platform.

For example, the request for the transportation service can include an origin location and a destination location. In some instances, unless specified otherwise, the origin of the transportation service can be assumed to be a current location of the first user (e.g., as indicated by location data such as GPS data received from the user device and/or as input by the user). A user can also supply a desired destination (e.g., by typing the destination into a text field which may, for example, provide suggested completed entries while the first user types). A multi-modal transportation itinerary from the origin location to the destination location can be generated based on the request for the transportation service. The multi-modal transportation itinerary can include two or more transportation legs (e.g., a first transportation leg, a second transportation leg, a third transportation leg, etc.) between the origin location and the destination location specified in the request.

The two or more transportation legs can include travel via two or more different transportation modalities such as, for example: cars, motorcycles, light electric vehicles (e.g., electric bicycles or scooters), buses, trains, aircraft (e.g., airplanes), watercraft, walking, and/or other transportation modalities. Example aircrafts can include airplanes, helicopters and other vertical take-off and landing aircraft (VTOL) such as electric vertical take-off and landing aircraft (eV-TOL). The vehicles can include non-autonomous, semi-autonomous, and/or fully-autonomous vehicles. For example, in some instances, the computing devices 125, 130, 155, 160, 165 can be associated with autonomous vehicles. Thus, the computing devices 125, 130, 155, 160, 165 can provide communications between the operations computing system 102 and an autonomy stack of the autonomous vehicle which autonomously controls motion of the autonomous vehicle.

The operations computing system 102 can facilitate the ability of a user to receive transportation on one or more of the transportation legs included in the itinerary. As an example, the operations computing system 102 can interact with the plurality of devices 125, 130, 155, 160, 165 to match the user with one or more transportation service providers for each transportation leg of the itinerary. For example, the operations computing system 102 can book or otherwise reserve a seat in, space on, or usage of one or more of the transportation modalities for the user. As an example, the request for a transportation service can include at least an aerial transport of the user. In response, the operations computing system 102 can determine an aerial service provider (e.g., associated with one or more aerial service provider computing device(s) 125) to provide the aerial transport for the user (e.g., book a seat on an aerial vehicle of the aerial service provider).

For example, in some implementations, the operations computing system 102 can store or include one or more machine-learned models. The models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In response to a user's request, the operations computing system 102 can utilize one or more algorithms and/or the machine-learned models to generate an itinerary for the user. As an example, in some implementations, the operations computing system 102 can sequentially analyze and identify potential transportation legs for each different available transportation modality. For example, a most critical, challenging, and/or supply-constrained transportation leg can be identified first and then the remainder of the itinerary can be stitched around such leg. In some implementations, the order of analysis for the different modalities can be a function of a total distance associated with the transportation service (e.g., shorter transportation services result in ground-based modalities being assessed first while longer transportation services result in flight-based modalities being assessed first). By way of example, the operations computing system 102 can assign the first user (and second user) to an aircraft for the middle leg of a three-leg multi-modal itinerary and, then, book a human-driven or autonomous ground-based vehicle for a first leg of the multi-modal itinerary to take the user(s) from an origin location to a first aircraft facility (e.g., to board the aircraft such as, for example, at an origin facility). At a later time (e.g., while the user(s) are in flight), the operations computing system 102 can book another human-driven or autonomous ground-based vehicle to take the user(s) from a second aircraft facility (e.g., a destination facility) to the specified destination location(s). In this manner, the operations computing system 102 can generate a multi-modal transportation itinerary for facilitation the aerial transportation of the multi-modal transportation service.

Figure 2:
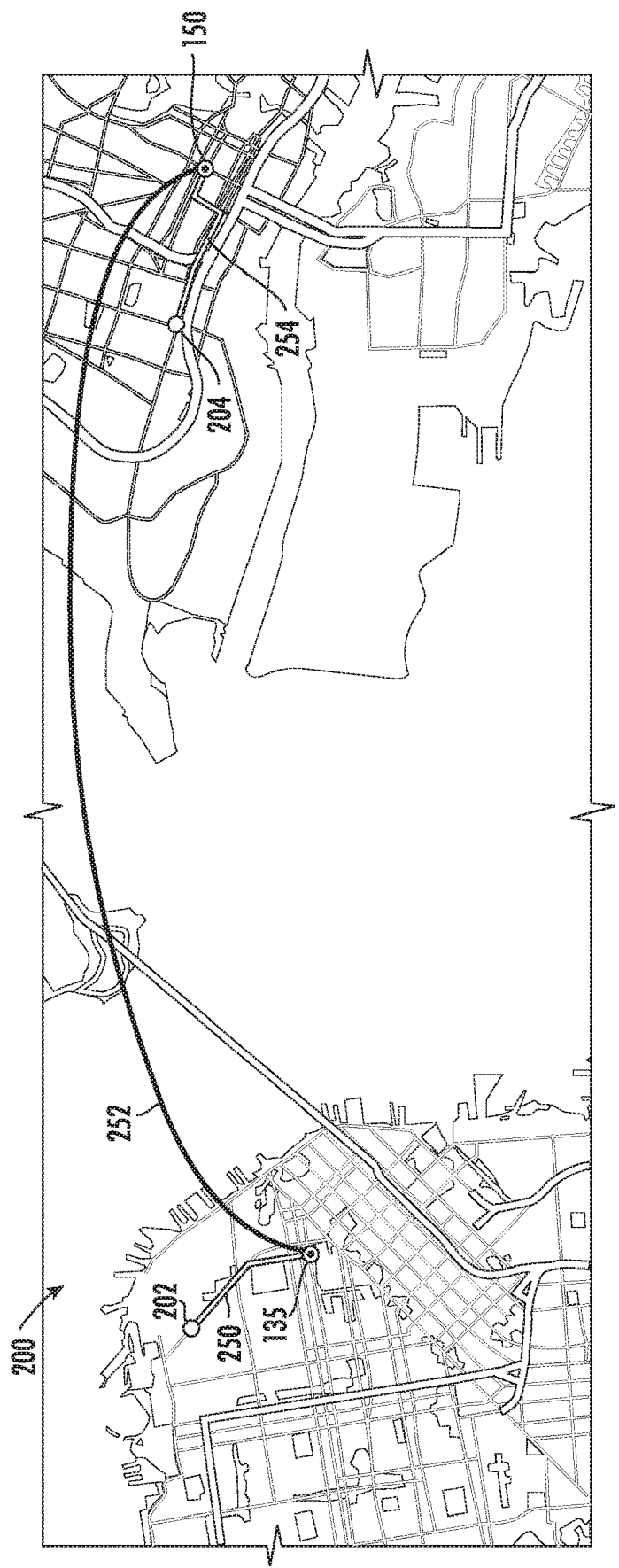
FIG. 2 depicts an example multi-modal transportation itinerary according to example implementations of the present disclosure.

Turning briefly to FIG. 2, FIG. 2 depicts an example multi-modal transportation itinerary 200 according to example implementations of the present disclosure. The multi-modal transportation itinerary 200 can include at least a first transportation leg 250, a second transportation leg 252, and a third transportation leg 254. For instance, the itinerary 200 can include three transportation legs to transport the user from an origin location 202 to a destination location 204. In particular, the itinerary 200 can include a first, ground-based (e.g., car-based) transportation leg 250 which transports the user from the origin location 202 to an origin facility 135; a second, flight-based transportation leg 252 which transports the user from the origin facility 135 to a destination facility 150; and a third, ground-based (e.g., car-based) transportation leg 254 which transports the user from the destination facility 150 to the destination location 204. An aerial service provider, for example, can be associated with the second transportation leg 252 to provide an aerial transport to the user during the second transportation leg 252.

Figure 3:
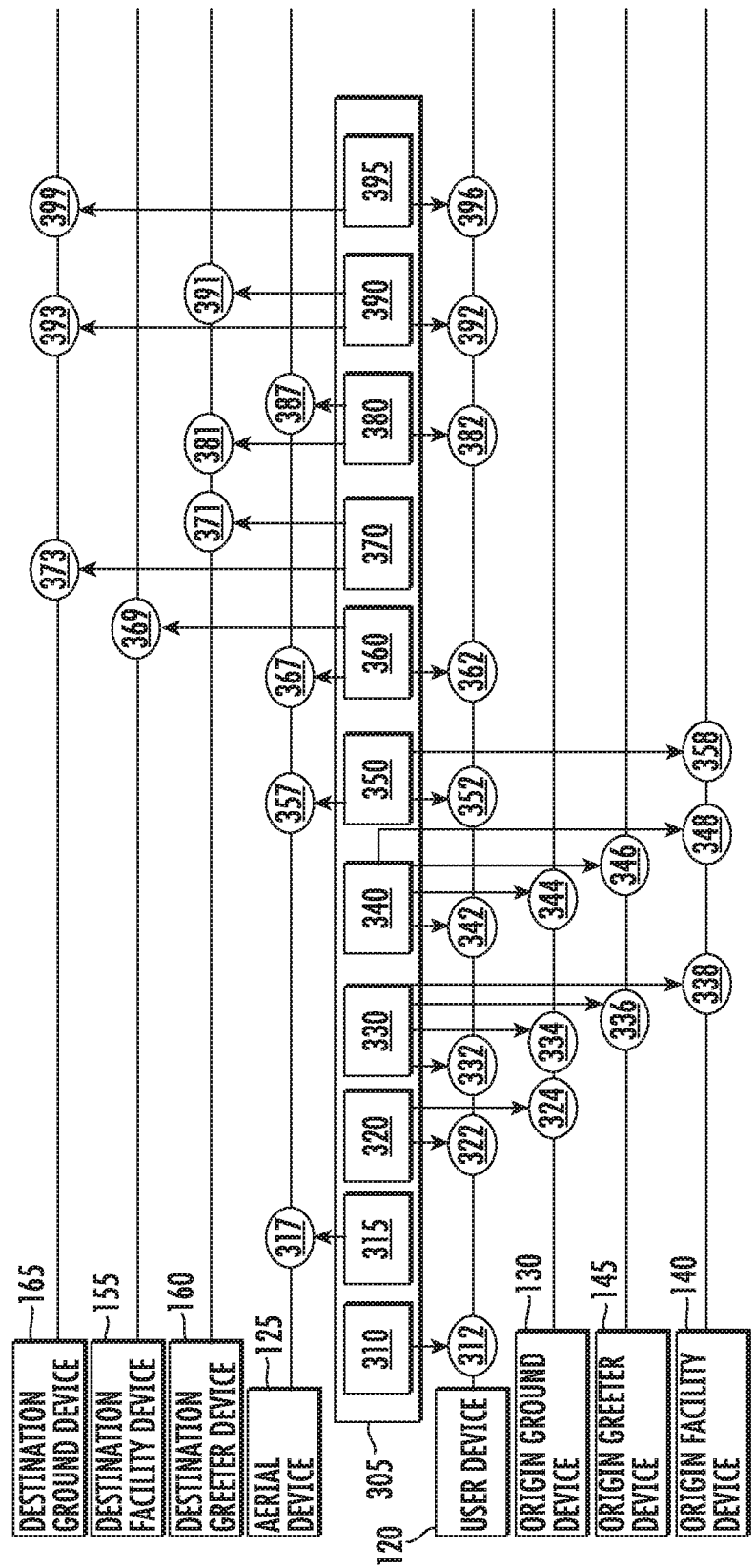
FIG. 3 depicts an example overview of a plurality of states of a transportation service according to example implementations of the present disclosure.

Turning briefly to FIG. 3, the multi-modal transportation service can be associated with a plurality of states 310, 315, 320, 330, 340, 350, 360, 370, 380, 390, 395 indicative of the progress of the transportation service. A non-exhaustive list for a multi-modal transportation service including the first transportation leg 250, the second transportation leg 252, and the third transportation leg 254 can include, for example, an initial state 310 indicating that a request for a transportation service has been received, an aerial assignment state 315 indicating that an aerial service provider has been determined for transportation service, a origin ground assignment state 320 indicating that a ground service provider has been determined for the transportation service, a first leg pick up state 330 indicating that a user has been picked up by the origin ground service provider, a first leg drop off state 340 indicating that a user has been dropped off by the origin ground service provider, a check-in state 350 indicating that a user has checked-in to the second transportation leg, an aerial pick up state 360 indicating that a user has been picked up by the aerial service provider, an approaching facility state 370 indicating that a user is approaching a destination facility, an aerial drop off state 380 indicating that a user has been dropped off by the aerial service provider, a third leg pick up state 390 indicating that a user has been picked up by a second ground service provider, a third leg drop off state 395 indicating that a user has been dropped off by the second ground service provider, etc.

Such states are given as examples only and the present disclosure is not limited to the states outlined above. Throughout the disclosure terms such as first, second, third, fourth, etc. states may be used to refer to any state associated with the transportation service. For example, a first state may refer to an initial state at times and a check-in state at other times depending on the context with which it is enumerated. The following description describes a plurality of state changes associated with a multi-modal transportation service. These can be described as state change(s) (e.g., initial state changes) and subsequent state change(s) (e.g., first, second, third subsequent state change(s), etc.), which occur after the state change (e.g., after an initial state change).

Turning back to FIG. 1, the operations computing system 102 can pool together the plurality of devices 120, 130, 140,

145, 155, 160, 165, 170 to facilitate the multi-modal transportation service. For example, each transportation leg can be associated (e.g., facilitated by, performed by, etc.) with one or more of the plurality of devices 120, 130, 140, 145, 155, 160, 165, 170. For instance, the multi-modal transportation service including three transportation legs can be associated with a plurality of devices including one or more user device(s) 120 (e.g., associated with each leg in the multi-modal transportation service) associated with a user of the transportation service, one or more ground vehicle service provider device(s) 130, 165 (e.g., one or more origin ground device(s) 130 associated with the first transportation leg 250, one or more destination ground device(s) 165 associated with the third transportation leg 254), one or more aerial device(s) 125 (e.g., associated with the second transportation leg 252) associated with an aerial service provider, and one or more greeter device(s) 145, 160 (e.g., an origin greeter device 145, destination greeter device 160, etc.) and facility device(s) 140, 155 (e.g., an origin facility device 140, destination facility device 155, etc.) associated with one or more greeter service providers and facility service providers, respectively. The operations computing system 102 can pool together the plurality of devices by initiating state changes at each respective device based on the current state (and/or state change) associated with the multi-modal transportation service.

By way of example, the request for a transportation service can be obtained from a user associated with a multi-modal transportation platform. The user can be associated with at least one user device 120. The user device 120 can include a user software application that runs on the user device and, in some implementations, the request for the transportation service can be generated via the user software application. The operations computing system 102 can initiate one or more states at the user device 120 during the transportation service. For example, the operations computing system 102 can initiate one or more states on the user device 120, via the user software application, based on the current state (and/or a state change) of the transportation service.

In addition, in some implementations, the multi-modal transportation service can be associated with one or more ground service provider device(s) 130, 165. For example, the multi-modal transportation service can be associated with an origin ground device 130 associated with the first transportation leg 250 of the multi-modal transportation service and a destination ground device 165 associated with the third transportation leg 254 of the multi-modal transportation service.

The origin ground device 130, for example, can be associated with a ground vehicle service provider. For instance, the origin ground device 130 can include a vehicle operations computing system associated with an autonomous ground vehicle, a driver computing device/user device associated with a human driver of a ground vehicle, etc. The origin ground device 130 can include an origin ground software application that runs on the origin ground device. The operations computing system 102 can initiate one or more states at the origin ground device 130 during the transportation service 200 (e.g., before, during, or after the first transportation leg 250). For example, the operations computing system 102 can initiate one or more states on the origin ground device 130, via the origin ground software application, based on the current state (and/or a state change) of the transportation service 200.

The destination ground device 165 can include a different device than the origin ground device 130. For example, the destination ground device 165 can be associated with a destination ground vehicle service provider. For instance, the destination ground device 165 can include a second vehicle operations computing system associated with a second autonomous ground vehicle, a second driver computing device/user device associated with a second driver of the second ground vehicle, etc. The destination ground device 165 can include a destination ground software application that runs on the destination ground device. In some implementations, the destination ground software application and the origin ground software application can include the same application running on different device(s) (e.g., the destination ground software application includes an application running on the destination ground device, the origin ground software application includes the same application running on the origin ground device). In addition, or alternatively, the destination ground software application and the origin ground software application can include distinct applications running on each device. The operations computing system 102 can initiate one or more states at the destination ground device 165 during the transportation service (e.g., before, during, or after the third transportation leg 254). For example, the operations computing system 102 can initiate one or more states on the destination ground device 165, via the destination ground software application, based on the current state (and/or a state change) of the transportation service.

In addition, in some implementations, the multi-modal transportation service can be associated with an aerial device 125. For example, the aerial device 125 can be associated with an aerial service provider associated with the second transportation leg 252 of the multi-modal transportation service. For instance, the aerial service provider device 125 can include an aerial vehicle operations computing system onboard an aerial vehicle, a pilot computing device associated with a pilot of the aerial vehicle, etc. The aerial device 125 can include an aerial software application that runs on the aerial device 125. The operations computing system 102 can initiate one or more states at the aerial device 125 during the transportation service (e.g., before, during, or after the second transportation leg 252). For example, the operations computing system 102 can initiate one or more states on the aerial device 125, via the aerial software application, based on the current state (and/or a state change) of the transportation service.

Additionally, the multi-modal transportation service can be associated with one or more greeter devices 145, 160 and/or facility devices 140, 155. Each greeter and/or facility device 140, 145, 155, 160 can be associated with an origin facility 135 and/or destination facility 150 for an aerial service provider (e.g., an aerial service provider can provide aerial transport between an origin facility 135 and a destination facility 150). By way of example, the multi-modal transportation service can be associated with an origin greeter device 145 associated with a greeter (e.g., a person/operations computing system for directing user(s) at the facility) at the origin facility 135 and an origin facility device 140 associated with the origin facility 135 (e.g., a person/operations computing system for checking a user in at the facility). In addition, the multi-modal transportation service can be associated with a destination greeter device 145 associated with a greeter at the destination facility 150 and/or a destination facility device 155 associated with the destination facility 150.

Thus, the origin greeter device 140 can be associated with the origin facility 135 of the aerial service provider and the destination greeter device 160 can be associated with the destination facility 150 of the aerial service provider. For instance, the origin/destination greeter device(s) 145, 160 can include a greeter operations computing system configured to direct a user at the origin/destination facility, a greeter user device associated with a human greeter at the origin/destination facility, etc. The origin/destination greeter device(s) 145, 160 can include an origin greeter software application that runs on the origin greeter device 145 and/or a destination greeter software application that runs on the destination greeter device 160. The origin greeter software application and the destination greeter software application can include the same application running on different device(s) (e.g., the destination greeter software application can include an application running on the destination greeter device and the origin greeter software application can include the same application running on the origin greeter device). In addition, or alternatively, the destination greeter software application and the origin greeter software application can include distinct applications running on each device. The operations computing system 102 can initiate one or more states at the origin/destination greeter devices 145, 160 during the transportation service 200 (e.g., before, during, or after the second transportation leg 252). For example, the operations computing system 102 can initiate one or more states at the origin/destination greeter device(s) 145, 160, via the respective software application, based on the current state (and/or a state change) of the transportation service.

Additionally, the origin facility device 140 can be associated with the origin facility 135 of the aerial service provider and the destination facility device 155 can be associated with the destination facility 150 of the aerial service provider. For instance, the origin/destination facility device(s) 140, 155 can include an origin operations computing system configured to check in a user at the origin/destination facility 135, 150, a facility device usable by a human to check in a user at the origin/destination facility 135, 150, etc. The origin/destination facility device(s) 140, 155 can include an origin facility software application that runs on the origin facility device 140 and/or a destination facility software application that runs on the destination facility device 155. The origin facility software application and the destination facility software application can include the same application running on different device(s) (e.g., the destination facility software application can include an application running on the destination facility device 155 and the origin facility software application can include the same application running on the origin facility device 140). In addition, or alternatively, the destination facility software application and the origin facility software application can include distinct applications running on each device. The operations computing system 102 can initiate one or more states at the origin/destination facility devices 140, 155 during the transportation service (e.g., before, during, or after the second transportation leg 252). For example, the operations computing system 102 can initiate one or more states at the origin/destination facility device(s) 140/155, via the respective software application, based on the current state (and/or a state change) of the transportation service.

The network(s) 180 can be any type of network or combination of networks that allows for communication between the operations computing system 102 and the devices 120, 125, 130, 140, 145, 155, 160. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Turning back to FIG. 3, FIG. 3 depicts an example overview of a plurality of states 305 of a transportation service according to example implementations of the present disclosure. The operations computing system 102 can monitor the transportation service to determine the occurrence of one or more state changes of a plurality of state changes associated with the transportation service. For example, each of the plurality of state changes can be indicative of a progress of the transportation service (e.g., a transition from one state of the transportation service to another).

The operations computing system 102 can determine the occurrence of a first state change indicative of a transition to an initial state 310. For example, the transportation service can transition to the initial state 310 in response to receiving a request for the transportation service. The operations computing system 102 can adjust the user software application at the user device 120 based on the state change. For example, the operations computing system 102 can determine a first user state change 312 for the user software application based on the state change. The first user state change 312 can include, for example, an indication that the user has requested the transportation service. The operations computing system 102 can generate first user state change data based on the first user state change 312 and communicate the data to the user device 120. The user device 120 can receive the data and, in response, implement the first user state change 312, for example, by displaying a confirmation of the transportation request as indicated by the first user state change data.

The operations computing system 102 can determine the occurrence of the second state change. The second state change, for example, can be indicative of a transition from the initial state 310 to an aerial assignment state 315. The second state change can occur, for example, in response to determining the aerial service provider to provide the aerial transport for the user. For example, the operations computing system 102 can identify an aerial service provider (e.g., an aerial vehicle, a seat assignment for the aerial vehicle, etc.) for transporting the user during the second leg of the multi-modal transportation service (e.g., from the origin facility to the destination facility). The operations computing system 102 can adjust the aerial software application associated with the aerial service provider based on the second state change. For example, operations computing system 102 can determine a first aerial state change 317 for the aerial software application that runs on the aerial device 125 of the aerial service provider.

Figure 4:
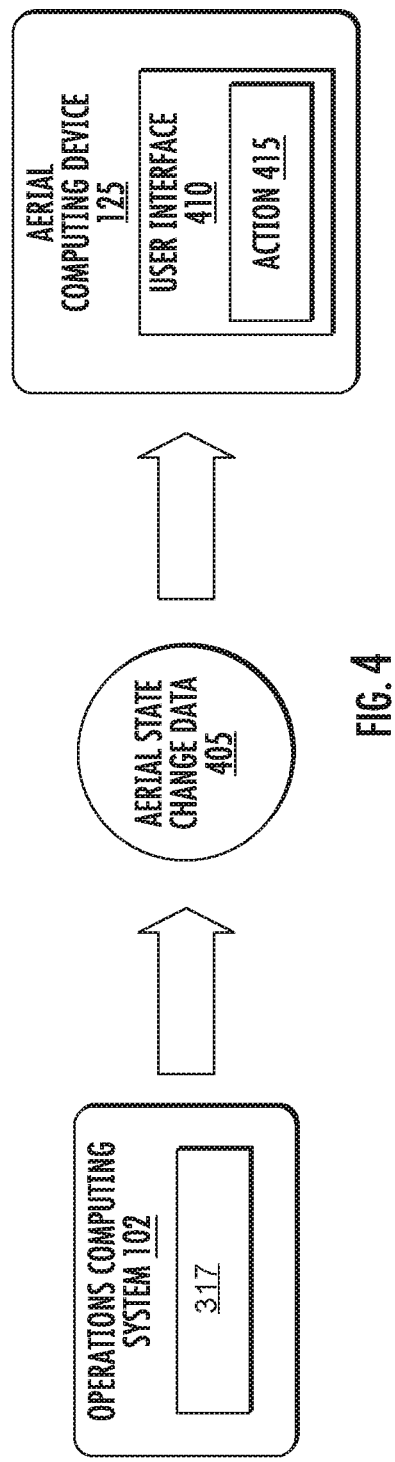
FIG. 4 depicts an example response to a state change according to example implementations of the present disclosure.

FIG. 4, for example, depicts a response to the second state change according to example implementations of the present disclosure. For example, the operations computing system 102 can generate first aerial state change data 405 based on the first aerial state change 317. The first aerial state change data 405 can include flight information such as, for example, a list of passengers for the aerial transportation service. The list of passengers can include, for example, user information (e.g., username, baggage info, etc.) for each passenger of the list of passengers. The operations computing system 102 can communicate the first aerial state change data 405 to the aerial device 125. The aerial device can be configured to receive the first aerial state change data 405 and, in response, implement the first aerial state change 317 within the aerial software application.

For example, the aerial software application of the aerial device 125 can include a user interface 410. The aerial device 125 can receive the aerial state change data 405 and implement the first aerial state change 317 by changing the user interface 410 of the aerial software application to reflect the first aerial state change 317. By way of example, the aerial device 125 can change the user interface 410 from an empty, incomplete, etc. passenger manifest to display a list of passengers and/or passenger information as indicated by the aerial state change data 405. In some implementations, similar such information can be displayed at an origin facility device 140.

Turning back to FIG. 3, the operations computing system 102 can determine the occurrence of a third state change indicative of a transition from the aerial assignment state 315 to an origin ground assignment state 320. The third state change can occur, for example, in response to determining the origin ground service provider to provide ground transportation for the user during the first transportation leg of the multi-modal transportation service. For example, the operations computing system 102 can identify an origin ground service provider for transporting the user during the first transportation leg of the multi-modal transportation service (e.g., from the user's requested origin location to the origin facility). The operations computing system 102 can adjust the origin ground software application associated with an origin ground device 130 of the origin ground service provider based on the third state change.

For example, the operations computing system 102 can determine a first origin ground state change 324 for the origin ground software application that runs on the origin ground device 130 of the origin ground service provider. For example, the operations computing system 102 can generate first origin ground state change data based on the first origin ground state change 324. The first origin ground state change 324 can include an indication that the user has been assigned to the origin ground service provider. For example, the first origin ground state change data can include information about the user (e.g., username, user location, preferences, etc.) and the itinerary (e.g., timing data (e.g., preferred arrival time), destination facility, origin location, etc.). The operations computing system 102 can communicate the first origin ground state change data to the origin ground device 130 to implement the first origin ground state change within the origin ground software application.

For example, the origin ground software application of the origin ground device 130 can include a user interface. The origin ground device 130 can receive first origin ground change data and implement the first origin ground state change 324 by changing the user interface of the origin ground software application to reflect the first origin ground state change 324. By way of example, the origin ground device 130 can change the user interface to display the user information as indicated by the first origin ground state change data.

In addition, or alternatively, the operations computing system 102 can adjust the user software application based on the third state change. For example, the operations computing system 102 can determine a second user state change 322 for the user software application. By way of example, the second user state change 322 can include an indication that the user has been assigned to the origin ground service provider (e.g., assignment confirmation) and/or information for the assignment (e.g., a driver name, vehicle type, location, rating, etc.).

The operations computing system 102 can generate second user state change data based on the second user state change 322. For example, the second user state change data can include information about the origin ground service provider (e.g., assignment confirmation) and/or information for the assignment (e.g., a driver name, vehicle type, location, rating, etc.). The operations computing system 102 can communicate the second user state change data to the user device 120 to implement the second user state change within the user software application, for example, by displaying the confirmation, assignment information, etc. within the user software application (e.g., on a user interface of the user device 120). In this manner, both the user and the origin ground service provider can obtain data indicative of the assignment of the origin ground service provider.

The operations computing system 102 can determine the occurrence of a fourth state change indicative of a transition from the origin ground assignment state 320 to a first leg pick-up state 330. The fourth state change can occur, for example, in response to determining that the origin ground service provider has picked-up the user for the first transportation leg of the multi-modal transportation itinerary. The operations computing system 102 can adjust the user software application, the origin ground software application, the origin greeter application, and/or the origin facility application based on the fourth state change.

For example, the operations computing system 102 can determine a second origin ground state change 334 for the origin ground software application. The second origin ground state change 334 can include an indication that the user has been picked-up by the origin ground service provider (e.g., a pick-up confirmation, etc.). The operations computing system 102 can generate second origin ground state change data based on the second origin ground state change 334 and communicate the data to the origin ground device 130. The origin ground device 130 can receive the data and, in response, implement the second origin ground state change 334, for example, by displaying the pick-up confirmation within the origin ground software application as indicated by the second origin ground state change data.

In addition, or alternatively, the operations computing system 102 can adjust the user software application based on the fourth state change. For example, the operations computing system 102 can determine a third user state change 332 for the user software application. By way of example, the third user state change 332 can include an indication that the user has been picked up by the origin ground service provider (e.g., a pick-up confirmation). The operations computing system 102 can generate third user state change data based on the third user state change 332 and communicate the data to the user device 120 to implement the third user state change 332, for example, by displaying the pick-up confirmation within the user software application as indicated by the third user state change data.

Additionally, in some implementations, the operations computing system 102 can adjust the origin greeter software application running on the origin greeter device 145 associated with the origin facility based on the fourth state change. For example, the operations computing system 102 can determine a first origin greeter state change 336 for the origin greeter software application. The first origin greeter state change 336, for example, can include an indication that the user has been picked up by the origin ground service provider (e.g., a pick-up confirmation, a user inbound notification, etc.). The operations computing system 102 can generate first origin greeter state change data based on the first origin greeter state change 336 and communicate the data to the origin greeter device 145. The origin greeter device 145 can receive the first origin greeter state change data and implement the first origin greeter state change 336, for example, by displaying the pick-up confirmation, the inbound notification, etc. within the origin greeter software application as indicated by the first origin greeter state change data.

In addition, in some implementations, the operations computing system 102 can adjust the origin facility software application running on the origin facility device 140 associated with the origin facility based on the fourth state change. For example, the operations computing system 102 can determine a first origin facility state change 338 for the origin facility software application. The first origin facility state change 338, for example, can include an indication that the user has been picked up by the origin ground service provider (e.g., a pick-up confirmation, a user inbound notification, etc.). The operations computing system 102 can generate first origin facility state change data based on the first origin facility state change 338 and communicate the data to the origin facility device 140. The origin facility device 140 can receive the first origin facility state change data and implement the first origin facility state change 338, for example, by displaying the pick-up confirmation, the inbound notification, etc. within the origin facility software application as indicated by the first origin facility state change data.

The operations computing system 102 can determine the occurrence of a fifth state change indicative of a transition from the first leg pick up state 330 to a first leg drop off state 340. The fifth state change can occur, for example, in response to determining that the origin ground service provider has dropped off the user at the origin facility. The operations computing system 102 can adjust the origin ground software application, the user software application, the origin greeter software application, and/or the origin facility software application based on the fifth state change.

For example, the operations computing system 102 can determine a third origin ground state change 344 for the origin ground software application. The third origin ground state change 344 can include an indication that the user has been dropped off by the origin ground service provider (e.g., a drop off confirmation, a trip summary, etc.). The operations computing system 102 can generate third origin ground state change data based on the third origin ground state change 344 and communicate the data to the origin ground device 130. The origin ground device 130 can receive the third origin ground state change data and implement the third origin ground state change 344, for example, by displaying the confirmation, the trip summary, etc. within the origin ground software application as indicated by the third origin ground state change data.

In addition, or alternatively, the operations computing system 102 can adjust the user software application based on the fifth state change. For example, the operations computing system 102 can determine a fourth user state change 342 for the user software application. The fourth user state change 342 can include an indication that the user has been dropped off up by the origin ground service provider (e.g., a drop off confirmation, a trip summary, etc.). The operations computing system 102 can generate fourth user state change data based on the fourth user state change 342 and communicate the data to the user device 120. The user device 120 can receive the fourth user state change data and implement the fourth user state change 342, for example, by displaying the confirmation, the trip summary, etc. within the user software application as indicated by the fourth user state change data.

Additionally, in some implementations, the operations computing system 102 can adjust the origin greeter software application based on the fifth state change. For example, the operations computing system 102 can determine a second origin greeter state change 346 for the origin greeter software application. The second origin greeter state change 346, for example, can include an indication that the user has been dropped off by the origin ground service provider (e.g., a drop off confirmation, a user arrival notification, etc.). The operations computing system 102 can generate second origin greeter state change data based on the second origin greeter state change 346 and communicate the data to the origin greeter device 145. The origin greeter device can receive the second origin greeter state change data and implement the second origin greeter state change 346, for example, by displaying the drop off confirmation, the arrival notification, etc. within the origin greeter software application as indicated by the second origin greeter state change data.

In addition, in some implementations, the operations computing system 102 can adjust the origin facility software application based on the fifth state change. For example, the operations computing system 102 can determine a second origin facility state change 348 for the origin facility software application. The second origin facility state change 348, for example, can include an indication that the user has been dropped off by the origin ground service provider (e.g., a drop off confirmation, a user arrival notification, etc.). The operations computing system 102 can generate second origin facility state change data based on the second origin facility state change 348 and communicate the data to the origin facility device 140. The origin facility device can receive the second origin facility state change data and implement the second origin facility state change 348, for example, by displaying the drop off confirmation, arrival notification, etc. within the origin facility software application as indicated by the second origin facility state change data. In this manner, the user, the origin ground service provider, the origin greeter, and the origin facility (e.g., a human operator associated therewith) can all, independently, obtain data indicative of the progress of the first transportation leg of the multi-modal transportation itinerary.

The operations computing system 102 can determine the occurrence of a sixth state change indicative of a transition from the first leg drop off state 340 to a check-in state 350. The sixth state change can occur, for example, in response to obtaining check-in data from the user (e.g., via the user device 120, the origin facility device 140, etc.). The operations computing system 102 can adjust the user software application, the aerial software application, and the origin facility software application based on the sixth state change. For example, operations computing system 102 can determine a fifth user state change 352 for the user software application, a second aerial state change 357 for the aerial software application, and/or a third origin facility state change 358 for the origin facility software application. The fifth user state change 352, second aerial state change 357, and/or third origin facility state change 358 can include an indication that the user has completed a checked-in operation for the second transportation leg.

Figure 5:
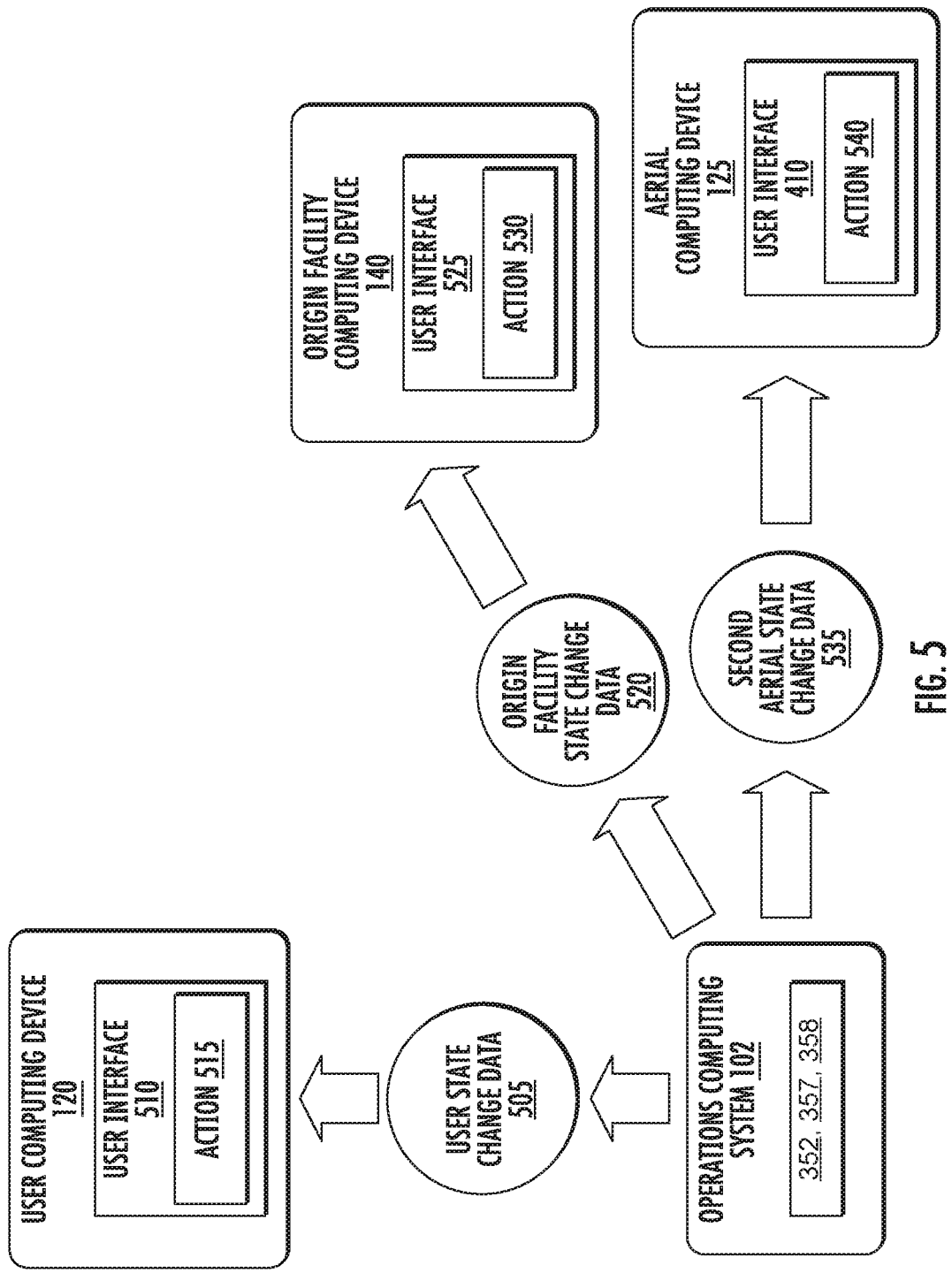
FIG. 5 depicts an example response to a state change according to example implementations of the present disclosure.

FIG. 5, for example, depicts a response to the sixth state change according to example implementations of the present disclosure. For example, the operations computing system 102 can generate fifth user state change data 505 based on the fifth user state change 352, second aerial state change data 535 based on the second aerial state change 357, and/or third origin facility state change data 520 based on the third origin facility state change 358.

The fifth user state change data 505 can include flight information such as, for example, a boarding pass indicative of the second transportation leg and/or one or more details of the second transportation leg (e.g., seat assignment information, departure time, arrival time, departure gate, etc.). The operations computing system 102 can communicate the fifth user state change data 505 to the user device 120. The user device 120 can be configured to receive the fifth user state change data 505 and, in response, implement the fifth user state change 352 within the user software application.

For example, the user software application can include a user interface 510. The user device 120 can receive the fifth user state change data 505 and perform an action 515 at the user interface 510. For instance, the action 515 can include adjusting the user interface 510 to display boarding pass information associated with the aerial transport and/or the user. In this manner, the user device 120 can implement the fifth user state change 352 within the user software application by adjusting the user interface 510 of the user software application to reflect the fifth user state change 352.

The second aerial state change data 535 can include check-in confirmation information, such as, for example, a check-in status of the user, a confirmation that the user has checked-in to the aerial transport, etc. The operations computing system 102 can communicate the second aerial state change data 535 to the aerial device 125. The aerial device 125 can be configured to receive the second aerial state change data 535 and, in response, implement the second aerial state change 357 within the aerial software application.

For example, aerial software application can include a user interface 410. The aerial device 125 can receive the second aerial state change data 535 and perform an action 540 at the user interface 410. For instance, the action 540 can include adjusting the user interface 410 to display check-in confirmation information associated with the aerial transport and/or the user. In this manner, the aerial device 125 can implement the second aerial state change 357 within the aerial software application by adjusting the user interface 410 of the aerial software application to reflect the second aerial state change 357.

The third origin facility state change data 520 can include confirmation information, such as, for example, a check-in status of the user, a confirmation that the user has checked-in to the aerial transport, etc. The operations computing system 102 can communicate the third origin facility state change data 520 to the origin facility device 140. The origin facility device 140 can be configured to receive the third origin facility state change data 520 and, in response, implement the third origin facility state change 358 within the origin facility software application.

For example, origin facility software application can include a user interface 525. The origin facility device 140 can receive the third origin facility state change data 520 and perform an action 530 at the user interface 525. For instance, the action 530 can include adjusting the user interface 525 to display confirmation information associated with the aerial transport and/or the user. In this manner, the origin facility device 140 can implement the third origin facility state change 358 within the origin facility software application by adjusting the user interface 525 of the origin facility software application to reflect the third origin facility state change 358 (e.g., by presenting a check-in status of the user, a confirmation that the user has checked-in to the aerial transport, etc.).

Turning back briefly to FIG. 3, the operations computing system 102 can determine the occurrence of a seventh state change indicative of a transition from the check-in state 350 to an aerial pick up state 360. The seventh state change can occur, for example, in response to the user boarding an aerial vehicle of the aerial service provider (e.g., at the start of the second transportation leg). The operations computing system 102 can adjust the user software application, the aerial software application, and/or the destination facility software application running on a destination facility device 155 based on the seventh state change. For example, the operations computing system 102 can determine a sixth user state change 362 for the user software application, a third aerial state change 367 for the aerial software application, and/or a first destination facility state change 369 for the destination facility software application. The sixth user state change 362, the third aerial state change 367, and/or the first destination facility state change 369 can each include an indication that the user has boarded an aerial vehicle for the aerial transport of the second transportation leg (e.g., a pick-up confirmation, a safety video, etc.).

Figure 6:
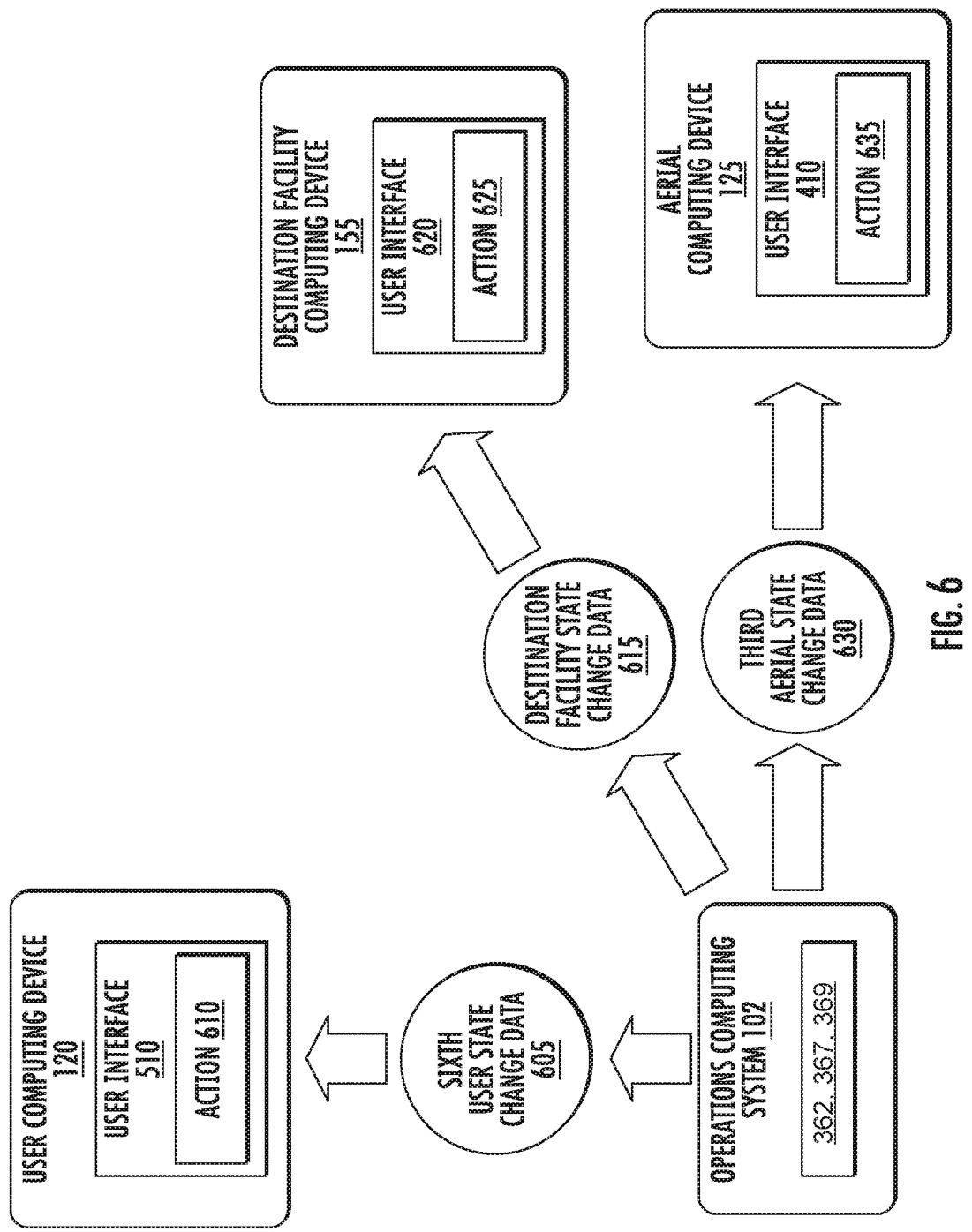
FIG. 6 depicts an example response to a state change according to example implementations of the present disclosure.

FIG. 6, for example, depicts a response to the seventh state change according to example implementations of the present disclosure. For example, the operations computing system 102 can generate sixth user state change data 605 based on the sixth user state change 362, third aerial state change data 630 based on the third aerial state change 367, and/or first destination facility state change data 615 based on the first destination facility state change 369.

The sixth user state change data 605 can include post-boarding flight information such as, for example, a trip duration, an expected arrival time, safety information such as an instructional safety video, etc. The operations computing system 102 can communicate the sixth user state change data 605 to the user device 120. The user device 120 can be configured to receive the sixth user state change data 605 and, in response, implement the sixth user state change 362 within the user software application.

For example, the user device 120 can receive the sixth user state change data 605 and perform an action 610 at the user interface 510. For instance, the action 610 can include adjusting the user interface 510 to display post-boarding flight information associated with the aerial transport and/or the user. By way of example, the action 610 can include displaying a trip duration, an expected arrival time, and/or an instructional safety video. In this manner, the user device 120 can implement the sixth user state change 362 within the user software application by displaying the post-boarding flight information.

The third aerial state change data 630 can include boarding confirmation information such as, for example, a boarding status of the user, a confirmation that the user has checked-in to the aerial transport, etc. The operations computing system 102 can communicate the third aerial state change data 630 to the aerial device 125. The aerial device 125 can be configured to receive the third aerial state change data 630 and, in response, implement the third aerial state change 367 within the aerial software application.

For example, the aerial device 125 can receive the third aerial state change data 630 and perform an action 635 at the user interface 410. For instance, the action 635 can include adjusting the user interface 410 to display boarding confirmation information associated with the aerial transport and/or the user. In this manner, the aerial device 125 can implement the third aerial state change 367 within the aerial software application by adjusting the user interface 410 of the aerial software application to reflect the third aerial state change 367.

The first destination facility state change data 615 can include boarding confirmation information such as, for example, a confirmation that a user has boarded a flight inbound to the destination facility associated with the destination facility device 155. The operations computing system 102 can communicate first destination facility state change data 615 to the destination facility device 155. The destination facility device 155 can be configured to receive the first destination facility state change data 615 and, in response, implement the first destination facility state change 369 within the destination facility software application.

For example, destination facility software application can include a user interface 620. The destination facility device 155 can receive the first destination facility state change data 615 and perform an action 625 at the user interface 620. For instance, the action 625 can include adjusting the user interface 620 to display boarding confirmation information associated with the aerial transport and/or the user. In this manner, the destination facility device 125 can implement the first destination facility state change 369 within the destination facility software application by adjusting the user interface 620 of the destination facility software application to reflect an indication that the user has boarded the aerial vehicle for the aerial transport to the destination facility associated with the destination facility device 155.

Turning back to FIG. 3, the operations computing system 102 can determine the occurrence of an eighth state change indicative of a transition from the aerial pick up state 360 to an approaching facility state 370. The eighth state change can occur, for example, in response to the aerial vehicle approaching the destination facility. For example, the eighth state change can be triggered when the aerial vehicle reaches a threshold distance from the destination facility and/or the origin facility. The threshold distance, for example, can include an optimal distance (and/or time) to schedule ground transportation for the third transportation leg. In some implementations, the operations computing system 102 can determine a destination ground vehicle service provider to provide ground transportation for the user during the third transportation leg of the transportation service based on the occurrence of the eighth state change.

The operations computing system 102 can adjust a destination ground software application running on a destination ground device 165 associated with the destination ground vehicle service provider based on the eighth state change. For example, the operations computing system 102 can identify a destination ground service provider for transporting the user during the third transportation leg of the multi-modal transportation service (e.g., from the destination facility to the user' requested destination). The operations computing system 102 can determine a first destination ground state change 373 for the destination ground software application. The first destination ground state change 373 can include an indication that the destination ground service provider has been assigned to transport the user from the destination facility to a destination location. The operations computing system 102 can generate first destination ground state change data based on the first destination ground state change 373 and communicate the data to the destination ground device 165. The destination ground device 165 can receive the first destination ground state change data and implement the first destination ground state change 373, for example, by displaying an indication of an assignment of the user to the destination ground device 165, user information, a destination location, etc. within the destination ground software application as indicated by the first destination ground state change data.

In addition, in some implementations, the operations computing system 102 can adjust a destination greeter software application running on a destination greeter device 160 associated with a destination greeter at the destination facility based on the eighth state change. For example, the operations computing system 102 can determine a first destination greeter state change 371 for the destination greeter software application. The first destination greeter state change 371 can include an indication that the user is approaching the destination facility (e.g., a user inbound notification, etc.). The operations computing system 102 can generate first destination greeter state change data based on the first destination greeter state change 371 and communicate the data to the destination greeter device 160. The destination greeter device 160 can receive the first destination greeter state change data and implement the first destination greeter state change 371, for example, by displaying a user inbound notification, etc. within the destination greeter software application as indicated by the first destination greeter state change data. For example, to implement the first destination greeter state change 371 within the destination greeter software application, a user interface of the destination greeter software application can be adjusted to display the user inbound notification.

The operations computing system 102 can determine the occurrence of a ninth state change indicative of a transition from the approaching facility state 370 to an aerial drop off state 380. The ninth state change can occur, for example, in response to the aerial service provider dropping off the user at the destination facility (e.g., at the completion of the second transportation leg). The operations computing system 102 can adjust the destination greeter software application, aerial software application, and/or user software application based on the ninth state change. For example, the operations computing system 102 can determine a second destination greeter state change 381 for the destination greeter software application, fourth aerial state change 387 for the aerial software application, and/or a seventh user state change 382 for the user software application. The second destination greeter state change 381, the fourth aerial state change 387, and/or the seventh user state change 382 can include an indication that the user has arrived at the destination facility (e.g., second transportation leg destination).

Figure 7:
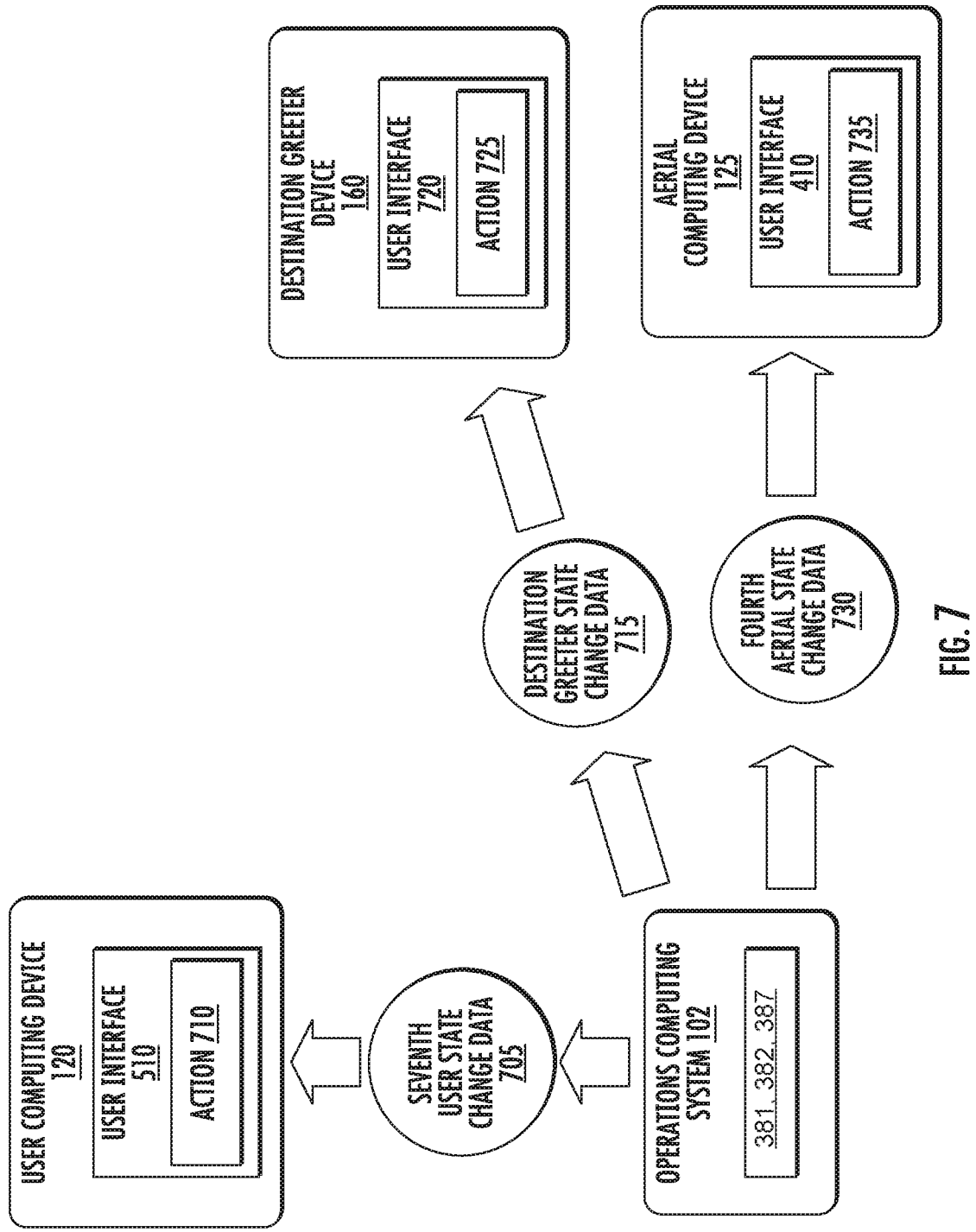
FIG. 7 depicts an example response to a state change according to example implementations of the present disclosure.

FIG. 7, for example, depicts a response to the ninth state change according to example implementations of the present disclosure. For example, the operations computing system 102 can generate second destination greeter state change data 715 based on the second destination greeter state change 381, fourth aerial state change data 730 based on the fourth aerial state change 387, and/or seventh user state change data 705 based on the seventh user state change 382.

The second destination greeter state change data 715 can include arrival information such as, for example, an indication that the aerial vehicle has reached the destination facility, a notification that the aerial vehicle has landed, a drop off confirmation, a notification that a third leg vehicle has been assigned, etc. The operations computing system 102 can communicate the second destination greeter state change data 715 to the destination greeter device 160. The destination greeter device 160 can be configured to receive the second destination greeter state change data 715 and, in response, implement the second destination greeter state change 381 within the destination greeter software application.

For example, the second destination greeter software application can include a user interface 720. The destination greeter device 160 can receive the second destination greeter state change data 715 and perform an action 725 at the user interface 720. For instance, the action 725 can include adjusting the user interface 720 to display arrival information associated with the aerial transport and/or the user. In this manner, the destination greeter device 160 can implement the second destination greeter state change 381 within the destination greeter software application by adjusting the user interface 720 of the destination greeter software application to reflect the second destination greeter state change 381.

The fourth aerial state change data 730 can include aerial vehicle landing information such as, for example, an indication that the aerial vehicle has reached the destination facility, a trip summary, a drop off confirmation, etc. The operations computing system 102 can communicate the fourth aerial state change data 730 to the aerial device 125. The aerial device 125 can be configured to receive the fourth aerial state change data 730 and, in response, implement the fourth aerial state change 387 within the aerial software application.

For example, the aerial device 125 can receive the fourth aerial state change data 730 and perform an action 735 at the user interface 410. For instance, the action 735 can include adjusting the user interface 410 to display aerial vehicle landing information such as by displaying the trip summary, the drop off confirmation, etc. associated with the aerial transport and/or the user. In this manner, the aerial device 125 can implement the fourth aerial state change 387 within the aerial vehicle software application by adjusting the user interface 410 of the aerial vehicle software application to reflect the fourth aerial state change 387.

The seventh user state change data 705 can include user landing information (e.g., an indication that the aerial vehicle has reached the destination facility, a notification that the aerial vehicle has landed, a drop off confirmation, a notification that a third leg vehicle has been assigned, etc.), third leg assignment information (e.g., an indication of the assignment, driver information, the destination location, user pick-up location, etc.), etc. The operations computing system 102 can communicate the seventh user state change data 705 to the user device 120. The user device 120 can be configured to receive the seventh user state change data 705 and, in response, implement the seventh user state change 382 within the user software application.

For example, the user device 120 can receive the seventh user state change data 705 and perform an action 710 at the user interface 510. For instance, the action 710 can include adjusting the user interface 510 to display user landing information, third leg assignment information, etc. By way of example, the user interface 510 of the user software application can be adjusted to display a notification that the second transportation leg has ended. In addition, or alternatively, the user interface 510 of the user software application can be adjusted to display a notification that the ground transportation for the third transportation leg has been assigned to transport the user from the destination facility to a destination location. For example, the action 710 can include displaying the notification that the aerial vehicle has landed, the drop off confirmation, the notification that the ground transportation for the third transportation leg has been assigned, etc. In this manner, the user device 120 can implement the seventh user state change 382 within the user software application by adjusting the user interface 510 of the user software application to reflect the seventh user state change 382.

With reference to FIG. 3, although an enumerated set of example state changes are provided above, the operations computing system 102 can determine the occurrence of any number of state changes indicative of the progress of the transportation service. In response to each state change, the operations computing system 102 can determine additional state changes at each respective device associated with the transportation service. For example, the operations computing system 102 can determine the occurrence of a tenth state change indicative of a transition from the aerial drop off state 380 to a third leg pick up state 390. In response, the operations computing system 102 can determine respective state changes 391, 392, 393 at one or more devices such as the destination ground device 165, the destination greeter device 160, the user device 120, etc. Moreover, the operations computing system 102 can determine the occurrence of an eleventh state change indicative of a transition from the third leg pick up state 390 to the third leg drop off state 395. In response, the operations computing system 102 can determine respective state changes 396, 399 at one or more devices such as the destination ground device 165, the user device 120, etc.

Figure 8:
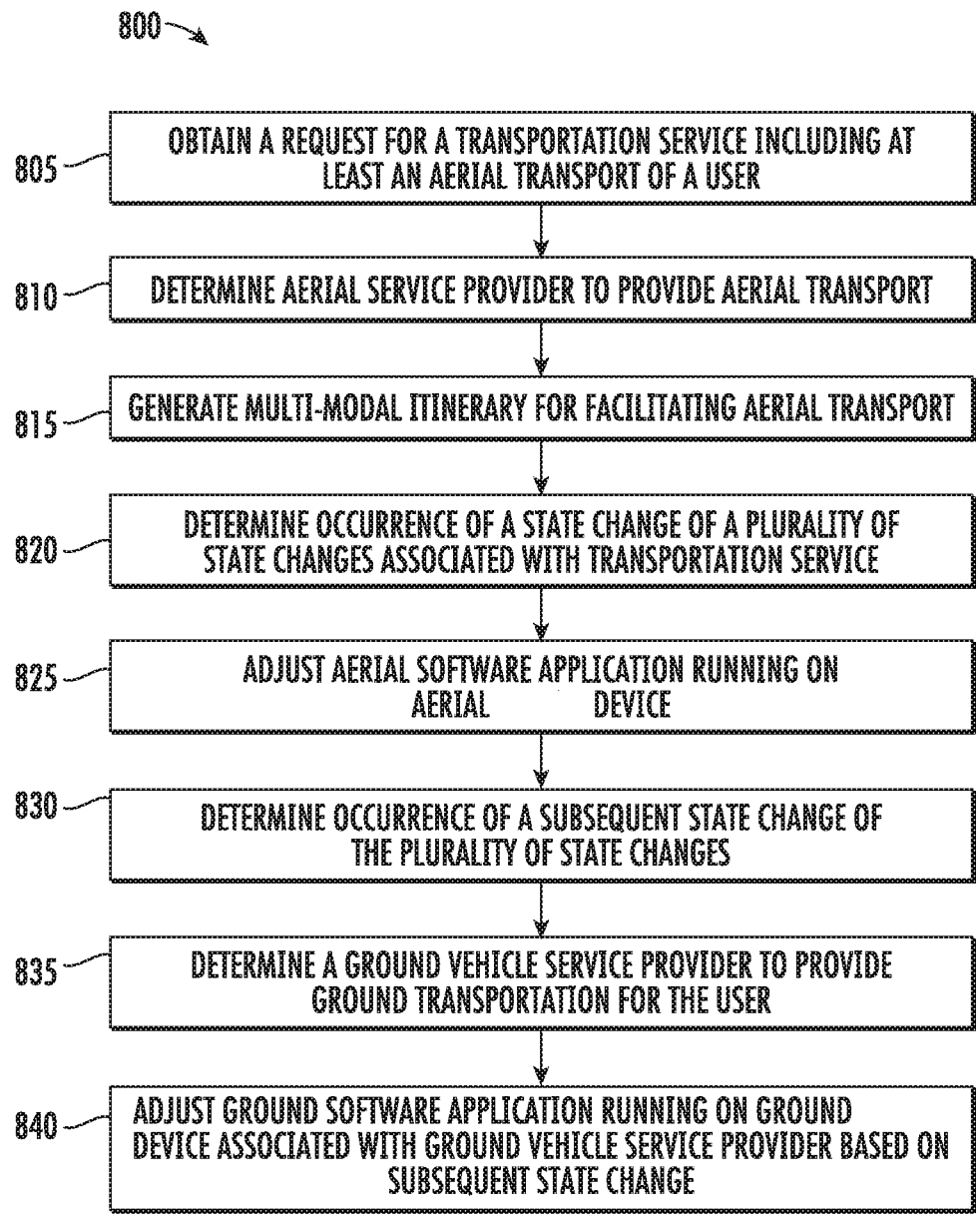
FIG. 8 depicts a flowchart diagram of an example method of initiating state changes among a plurality of devices during a multi-modal transportation service according to example implementations of the present disclosure.

FIG. 8 depicts a flowchart diagram of an example method 800 of facilitating a multi-modal transportation service according to example implementations of the present disclosure. One or more portion(s) of the method 800 can be implemented by a computing system that includes one or more computing devices such as, for example, the computing systems described with reference to the other figures (e.g., the operations computing system 102, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-7, 10, 11, etc.), for example, to facilitate the multi-modal transportation service. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 can include obtaining a request for a transportation service including at least an aerial transport of a user. For example, a computing system (e.g., operations computing system 102, etc.) can obtain a request for a transportation service including at least an aerial transport of a user. For instance, the computing system can obtain, from a user device, a request for a transportation service that includes at least an aerial transport of a user. The request can be generated via a user software application that runs on the user device.

At 810, the method 800 can include determining an aerial service provider to provide the aerial transport. For example, a computing system (e.g., operations computing system 102, etc.) can determine an aerial service provider to provide the aerial transport. For instance, the computing system can At 815, the method 800 can include generating a multi-modal itinerary for facilitating the aerial transport. For example, a computing system (e.g., operations computing system 102, etc.) can generate a multi-modal itinerary for facilitating the aerial transport for the user. The multi-modal transportation itinerary can include at least a first transportation leg, a second transportation leg, and a third transportation leg. For example, the aerial service provider can be associated with the second transportation leg to provide the aerial transport to the user during the second transportation leg.

At 820, the method 800 can include determining an occurrence of a state change of a plurality of state changes associated with the transportation service. For example, a computing system (e.g., operations computing system 102, etc.) can determine an occurrence of a state change of a plurality of state changes associated with the transportation service. Each of the plurality of state changes can be indicative of a progress of the transportation service.

At 825, the method 800 can include adjusting an aerial software application running on an aerial device. For example, a computing system (e.g., operations computing system 102, etc.) can adjust an aerial software application running on an aerial device associated with the aerial service provider based at least in part on the state change. By way of example, the computing system can determine an aerial state change for the aerial software application. The aerial state change can include an indication that the user has completed a check-in operation for the second transportation leg. The computing system can communicate data to the aerial device to implement the aerial state change within the aerial software application. For example, a user interface of the aerial software application can be adjusted to reflect the aerial state change.

At 830, the method 800 can include determining an occurrence of a subsequent state change of the plurality of state changes. For example, a computing system (e.g., operations computing system 102, etc.) can determine an occurrence of a subsequent state change of the plurality of state changes associated with the transportation service. The subsequent state change can occur after the state change.

At 835, the method 800 can include determining a ground vehicle service provider to provide ground transportation for the user. For example, a computing system (e.g., operations computing system 102, etc.) can determine a ground vehicle service provider to provide ground transportation for the user during the third transportation leg based, at least in part, on the subsequent state change.

At 840, the method 800 can include adjusting a ground software application running on a ground device associated with the ground vehicle service provider based on the subsequent state change. For example, a computing system (e.g., operations computing system 102, etc.) can adjust a ground software application that runs on a ground device associated with the ground vehicle service provider based, at least in part, on the subsequent state change. The ground vehicle service provider can be assigned to transport the user to a destination location.

Figure 9:
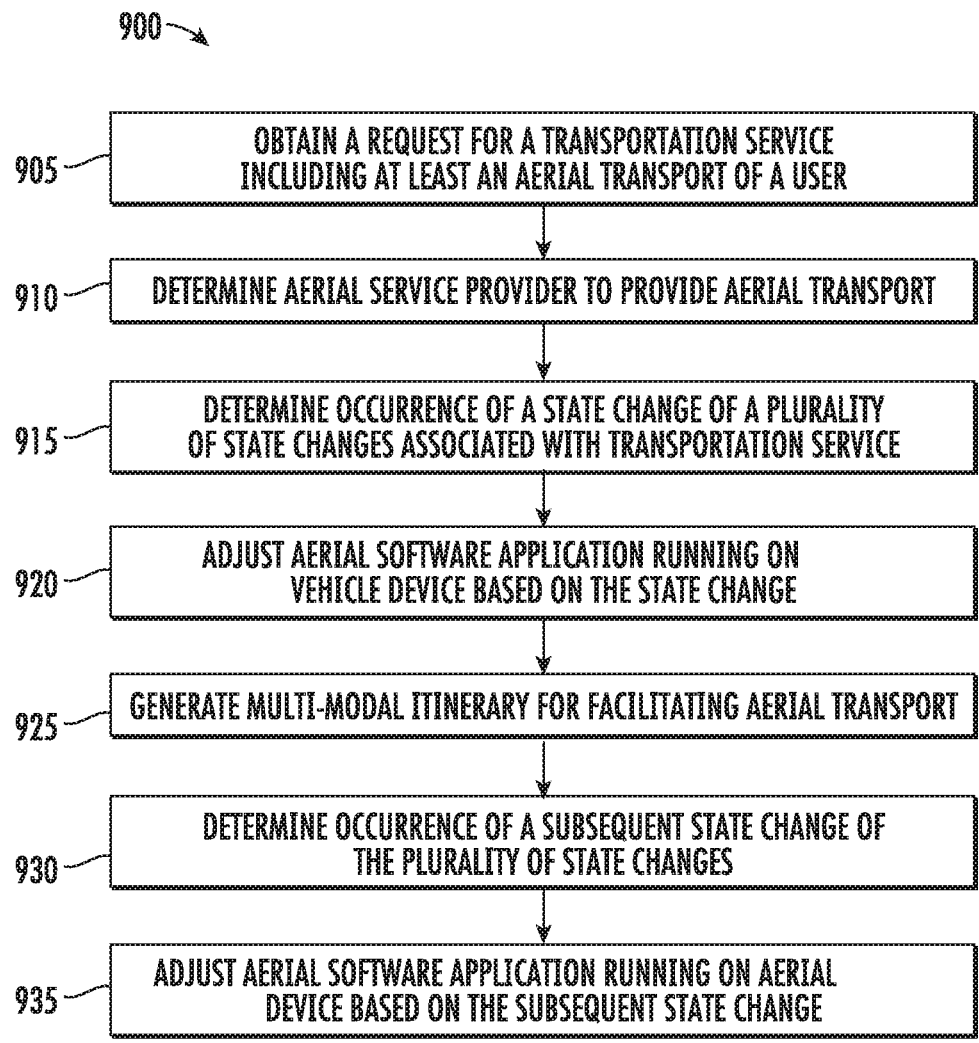
FIG. 9 depicts a flowchart diagram of an example method of initiating state changes among a plurality of devices during a multi-modal transportation service according to example implementations of the present disclosure.

FIG. 9 depicts a flowchart diagram of an example method 900 of facilitating a multi-modal transportation service according to example implementations of the present disclosure. One or more portion(s) of the method 900 can be implemented by a computing system that includes one or more computing devices such as, for example, the computing systems described with reference to the other figures (e.g., the operations computing system 102, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-7, 10, 11, etc.), for example, to facilitate the multi-modal transportation service. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 905, the method 900 can include obtaining a request for a transportation service including at least an aerial transport of a user. For example, a computing system (e.g., operations computing system 102, etc.) can obtain, from a user device, a request for a transportation service that includes at least an aerial transport of a user. The request can be generated via a user software application that runs on the user device.

At 910, the method 900 can include determining an aerial service provider to provide the aerial transport. For example, a computing system (e.g., operations computing system 102, etc.) can determine an aerial service provider to provide the aerial transport for the user.

At 915, the method 900 can include determining an occurrence of a state change of a plurality of state changes associated with the transportation service. For example, a computing system (e.g., operations computing system 102, etc.) can determine an occurrence of a state change of a plurality of state changes associated with the transportation service. Each of the plurality of state changes can be indicative of a progress of the transportation service. For instance, the state change can occur in response to determining the aerial service provider to provide the aerial transport for the user.

At 920, the method 900 can include adjusting an aerial software application running on an aerial device based on the state change. For example, a computing system (e.g., operations computing system 102, etc.) can adjust an aerial software application that runs on an aerial device associated with the aerial service provider based at least in part on the state change. For instance, the computing system can determine, based at least in part on the state change, an aerial state change for the aerial software application. The aerial state change can include an indication that the user has been assigned to the aerial service provider. The computing system can communicate the data to the aerial device to implement the aerial state change within the aerial software application.

At 925, the method 900 can include generating a multi-modal itinerary for facilitating the aerial transport. For example, a computing system (e.g., operations computing system 102, etc.) can generate a multi-modal transportation itinerary, based at least in part on the state change, for facilitating the aerial transport for the user. The itinerary can include at least a first transportation leg, a second transportation leg, and a third transportation leg. The aerial service provider can be associated with the second transportation leg to provide the aerial transport to the user during the second transportation leg.

At 930, the method 900 can include determining an occurrence of a subsequent state change of the plurality of state changes. For example, a computing system (e.g., operations computing system 102, etc.) can determine an occurrence of a subsequent state change of the plurality of state changes associated with the transportation service. For instance, the computing system can determine that the user has completed a check-in operation for the second transportation leg. The subsequent state change can occur as a result of determining that the user has completed the check-in operation for the second transportation leg.

At 935, the method 900 can include adjusting an aerial software application running on the aerial device based on the subsequent state change. For example, a computing system (e.g., operations computing system 102, etc.) can adjust the aerial software application that runs on the aerial device associated with the aerial service provider based at least in part on the subsequent state change. For instance, the computing system can determine, based at least in part on the subsequent state change, a subsequent aerial state change for the aerial software application. The subsequent aerial state change can include an indication that the user has completed the check-in operation for the second transportation leg. The computing system can communicate a data indicative of the subsequent aerial state change to the aerial device to implement the subsequent aerial state change within the aerial software application.

FIG. 10 depicts example system components of an example system 1000 according to example embodiments of the present disclosure. The example system 1000 can include the computing system 1005 (e.g., an operations computing system 102) and the computing system(s) 1150 (e.g., user computing devices 120, origin ground computing devices 130, origin facility computing devices 140, origin greeter computing devices 145, destination facility computing devices 155, destination greeter computing devices 160, destination ground computing devices 165, etc.), etc. that are communicatively coupled over one or more network(s) 1045.

The computing system 1005 can include one or more computing device(s) 1010. The computing device(s) 1010 of the computing system 1005 can include processor(s) 1015 and a memory 1020. The one or more processors 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and combinations thereof.

The memory 1020 can store information that can be accessed by the one or more processors 1015. For instance, the memory 1020 (e.g., one or more non-transitory computer-readable storage mediums, memory devices) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 to perform operations such as any of the operations and functions of the operations computing system 102, or for which the operations computing system 102 is configured, as described herein.

The memory 1020 can store data 1030 that can be obtained, received, accessed, written, manipulated, created, and/or stored. The data 1030 can include, for instance, itinerary data, state data, user data, and/or other data/information described herein. In some implementations, the computing device(s) 1010 can obtain from and/or store data in one or more memory device(s) that are remote from the computing system 1005 such as one or more memory devices of the computing system 1050.

The computing device(s) 1010 can also include a communication interface 1035 used to communicate with one or more other system(s) (e.g., computing system 1050). The communication interface 1035 can include any circuits, components, software, etc. for communicating via one or more networks (e.g., 1045). In some implementations, the communication interface 1035 can include for example, one or more of a communications controller, receiver, transceiver, transmitter, port, conductors, software and/or hardware for communicating data/information.

The computing system 1050 can include one or more computing devices 1055. The one or more computing devices 1055 can include one or more processors 1060 and a memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more non-transitory computer-readable storage media, such as RAM, ROM, EEPROM, EPROM, one or more memory devices, flash memory devices, etc., and combinations thereof.

The memory 1065 can store information that can be accessed by the one or more processors 1060. For instance, the memory 1065 (e.g., one or more non-transitory computer-readable storage mediums, memory devices) can store data 1075 that can be obtained, received, accessed, written, manipulated, created, and/or stored. The data 1075 can include, for instance, user data, ground data (e.g., driver data, ground vehicle data, etc.), facility data, aerial (e.g., pilot data, aerial vehicle data, etc.), and/or other data or information described herein. In some implementations, the computing system 1050 can obtain data from one or more memory device(s) that are remote from the computing system 1050.

The memory 1065 can also store computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060. For example, the memory 1065 can store instructions 1070 that when executed by the one or more processors 1060 cause the one or more processors 1060 to perform any of the operations and/or functions described herein, including, for example, any of the operations and functions of the user computing devices 120, origin ground computing devices 130, origin facility computing devices 140, origin greeter computing devices 145, destination facility computing devices 155, destination greeter computing devices 160, destination ground computing devices 165, and/or other operations and functions.

The computing device(s) 1055 can also include a communication interface 1080 used to communicate with one or more other system(s). The communication interface 1080 can include any circuits, components, software, etc. for communicating via one or more networks (e.g., 1045). In some implementations, the communication interface 1080 can include for example, one or more of a communications controller, receiver, transceiver, transmitter, port, conductors, software and/or hardware for communicating data/information.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

FIG. 10 illustrates one example system 1000 that can be used to implement the present disclosure. Other computing systems can be used as well. Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising:
   one or more processors; and
   one or more memory devices, the one or more memory devices storing instructions that when executed by the one or more processors cause the computing system to perform operations, the operations comprising:
   obtaining, from a user device, a request for a transportation service that comprises at least an aerial transport of a user, wherein the request is generated via a user software application that runs on the user device;
   determining an aerial service provider associated with at least one aerial service provider device to provide the aerial transport for the user, wherein the aerial transport is associated with an origin facility and a destination facility;
   generating a multi-modal transportation itinerary for facilitating the aerial transport for the user, the multi-modal transportation itinerary comprising at least a first transportation leg, a second transportation leg, and a third transportation leg, wherein the aerial service provider is associated with the second transportation leg to provide the aerial transport to the user during the second transportation leg;
   monitoring the transportation service that comprises at least the aerial transport of the user to determine a plurality of state changes associated with the transportation service, wherein each of the plurality of state changes is indicative of a progress of the transportation service,
      wherein monitoring the transportation service comprises obtaining data associated with a plurality of devices involved in the transportation service, wherein the plurality of devices comprise the user device, one or more ground vehicle service provider devices, one or more aerial vehicle service provider devices, and one or more facility devices,
      wherein each respective state change of the plurality of state changes is associated with one or more corresponding user interface states at one or more of the plurality of devices, wherein each respective user interface state corresponds to a user interface at a respective device of the plurality of devices,
   wherein monitoring the transportation service comprises:
      determining a state change associated with the transportation service of the plurality of state changes associated with the transportation service;
      in response to the state change associated with the transportation service, adjusting an aerial software application that runs on the at least one aerial service provider device based at least in part on an aerial user interface state corresponding to the state change associated with the transportation service, wherein the aerial software application is adjusted to update a passenger manifest displayed by an aerial user interface of the aerial software application;
      determining a subsequent state change associated with the transportation service of the plurality of state changes associated with the transportation service, wherein the subsequent state change occurs after the state change;
      determining a ground vehicle service provider associated with at least one ground vehicle service provider device to provide ground transportation for the user during the third transportation leg based, at least in part, on the subsequent state change; and
      adjusting a ground software application that runs on the at least one ground vehicle service provider device associated with the ground vehicle service provider based, at least in part, on a ground vehicle service provider user interface state corresponding to the subsequent state change, wherein the ground software application is adjusted to display an indication of an assignment of the user to the ground vehicle service provider through a vehicle service provider user interface of the ground software application;
      determining a second subsequent state change associated with the transportation service of the plurality of state changes associated with the transportation service, wherein the second subsequent state change occurs after the state change and the subsequent state change; and
      in response to the second subsequent state change:
         determining, based at least in part on the second subsequent state change associated with the transportation service, a destination greeter user interface state corresponding to the second subsequent state change for a destination greeter software application that runs on a destination greeter device associated with the destination facility, wherein the destination greeter user interface state comprises an indication that the aerial transport has arrived at the destination facility; and adjusting the destination greeter software application that runs on the greeter device based on the destination greeter user interface state, wherein the destination greeter software application is adjusted to display the indication of the assignment of the user to the ground vehicle service provider through a destination greeter user interface of the destination greeter software application.

2. The computing system of claim 1, wherein the operations further comprise:

adjusting the user software application that runs on the user device associated with the user based, at least in part, on a user interface state corresponding to the state change associated with the transportation service.

3. The computing system of claim 2, wherein adjusting the user software application that runs on the user device associated with the user based on the user interface state corresponding to the state change associated with the transportation service comprises:

determining the user state change for the user of the user software application, wherein the user state change comprises an indication that the user has completed a checked-in operation for the second transportation leg; and communicating data to the user device to implement the user interface state within the user software application.

4. The computing system of claim 3, wherein to implement the user interface state within the user software application, an interface of the user software application is adjusted to reflect the user interface state.

5. The computing system of claim 4, wherein the interface of the user software application is adjusted to display boarding pass information associated with the aerial transport and the user.

6. The computing system of claim 1, wherein the operations further comprise:

determining a third subsequent state change associated with the transportation service of the plurality of state changes associated with the transportation service, wherein the third subsequent state change occurs after the state change and before the subsequent state change;

determining, based at least in part on the third subsequent state change associated with the transportation service, a subsequent user interface state corresponding to the third subsequent state change associated with the transportation service for the user software application, wherein the subsequent user state change occurs after the user interface state and comprises an indication that the user has boarded an aerial vehicle for the aerial transport; and communicating data to the user device to implement the subsequent user interface state within the user software application.

7. The computing system of claim 6, wherein the operations further comprise:

determining, based at least in part on the third subsequent state change associated with the transportation service, a subsequent aerial user interface state corresponding to the third subsequent state change for the aerial software application, wherein the subsequent aerial user interface state comprises an indication that the user has boarded the aerial transport; and in response to the third subsequent state change associated with the transportation service, adjusting the aerial software application that runs on the at least one aerial service provider device, wherein the aerial software application is adjusted to provide, via the aerial user interface, the indication that the user has boarded the aerial transport.

8. The computing system of claim 6, wherein the operations further comprise:

determining, based at least in part on the third subsequent state change associated with the transportation service, a destination facility user interface state corresponding to the third subsequent state change for a destination facility software application that runs on a destination facility device associated with the destination facility, wherein the destination facility user interface state comprises the indication that the user has boarded the aerial vehicle for the aerial transport; and in response to the third subsequent state change associated with the transportation service, adjusting the destination facility software application that runs on the facility device associated with the destination facility, wherein the destination facility software application is adjusted to provide, via the destination facility user interface, the indication that the user has boarded the aerial vehicle.

9. The computing system of claim 1, wherein adjusting the aerial software application that runs on the at least one aerial service provider device based, at least in part, on the aerial user interface state corresponding to the state change associated with the transportation service comprises:

determining the aerial user interface state for the aerial software application, wherein the aerial user interface state comprises an indication that the user has completed a check-in operation for the second transportation leg; and communicating data to the at least one aerial service provider device to implement the aerial user interface state within the aerial software application.

10. The computing system of claim 1, wherein the operations further comprise:

adjusting an origin facility software application that runs on an origin facility device associated with the origin facility based, at least in part, on an origin facility user interface state corresponding to the state change associated with the transportation service.

11. The computing system of claim 1, wherein the operations further comprise:

determining, based at least in part on the subsequent state change associated with the transportation service, the destination greeter user interface state corresponding to the subsequent state change for the destination greeter software application, wherein the destination greeter state change comprises an indication that the aerial transport is approaching the destination facility; and in response to the subsequent state change associated with the transportation service, adjusting the destination greeter software application that runs on the destination greeter device associated with the destination facility, wherein the destination greeter software application is adjusted to provide, via the destination greeter user interface, the indication that the aerial transport is approaching the destination facility.

12. A computing system comprising:
one or more processors; and
one or more memory devices, the one or more memory devices storing instructions that when executed by the one or more processors cause the computing system to perform operations, the operations comprising:
- monitoring a transportation service that comprises at least an aerial transport of a user to determine a plurality of state changes associated with the transportation service, wherein each of the plurality of state changes is indicative of a progress of the transportation service,
  - wherein monitoring the transportation service comprises obtaining data associated with a plurality of devices involved in the transportation service, wherein the plurality of devices comprise a user device, one or more ground vehicle service provider devices, one or more aerial vehicle service provider devices, and one or more facility devices,
  - wherein each respective state change of the plurality of state changes is associated with one or more corresponding user interface states at one or more of the plurality of devices, wherein each respective user interface state corresponds to a user interface at a respective device of the plurality of devices;
- obtaining, from the user device, a request for the transportation service, wherein the request is generated via a user software application that runs on the user device;
- determining an aerial service provider associated with at least one aerial service provider device to provide the aerial transport for the user, wherein the aerial transport is associated with an origin facility and a destination facility;
- determining a state change associated with the transportation service of the plurality of state changes associated with the transportation service;
- adjusting an aerial software application that runs on an aerial device associated with the aerial service provider based at least in part on an aerial user interface state corresponding to the state change associated with the transportation service, wherein the aerial software application is adjusted to update a passenger manifest displayed by an aerial user interface of the aerial software application;
- generating a multi-modal transportation itinerary, based at least in part on the state change associated with the transportation service, for facilitating the aerial transport for the user, the itinerary comprising at least a first transportation leg, a second transportation leg, and a third transportation leg, wherein the aerial service provider is associated with the second transportation leg to provide the aerial transport to the user during the second transportation leg;
- determining a subsequent state change associated with the transportation service of the plurality of state changes associated with the transportation service, wherein the subsequent state change occurs after the state change; and
- adjusting the aerial software application that runs on the aerial device associated with the aerial service provider based at least in part on a subsequent aerial user interface state corresponding to the subsequent state change, wherein the aerial software application is adjusted to display, via the aerial user interface of the aerial software application, check-in information for the user;
- determining a second subsequent state change associated with the transportation service, wherein the second subsequent state change occurs after the state change and the subsequent state change;
- adjusting a ground software application that runs on at least one ground vehicle service provider device associated with a ground vehicle service provider based, at least in part, on a ground vehicle service provider user interface state corresponding to the second subsequent state change, wherein the ground software application is adjusted to display an indication of an assignment of the user to the ground vehicle service provider through a vehicle service provider user interface of the ground software application;
- determining a third subsequent state change associated with the transportation service, wherein the third subsequent state change occurs after the second subsequent state change; and
- in response to the third subsequent state change:
  - determining, based at least in part on the third subsequent state change, a destination greeter user interface state corresponding to the third subsequent state change for a destination greeter software application that runs on a destination greeter device associated with the destination facility, wherein the destination greeter user interface state comprises an indication that the aerial transport has arrived at the destination facility; and
  - adjusting the destination greeter software application that runs on the greeter device based on the destination greeter user interface state, wherein the destination greeter software application is adjusted to display the indication of the assignment of the user to the ground vehicle service provider through a destination greeter user interface of the destination greeter software application.

13. The computing system of claim 12, wherein the state change occurs in response to determining the aerial service provider to provide the aerial transport for the user.

14. The computing system of claim 12, wherein determining the subsequent state change associated with the transportation service of the plurality of state changes associated with the transportation service comprises:
- determining that the user has completed a check-in operation for the second transportation leg, wherein the subsequent state change associated with the transportation service occurs as a result of determining that the user has completed the check-in operation for the second transportation leg.

15. A computer-implemented method, the method comprising:
- obtaining, by a computing system comprising one or more computing devices from a user device, a request for a transportation service that comprises at least an aerial transport of a user, wherein the request is generated via a user software application that runs on the user device;
- determining, by the computing system, an aerial service provider to provide the aerial transport for the user, wherein the aerial transport is associated with an origin facility and a destination facility;
- generating, by the computing system, a multi-modal transportation itinerary for facilitating the aerial transport for the user, the multi-modal transportation itinerary comprising at least a first transportation leg, a second transportation leg, and a third transportation leg, wherein the aerial service provider is associated with the second transportation leg to provide the aerial transport to the user during the second transportation leg;

monitoring the transportation service that comprises at least the aerial transport of the user to determine a plurality of state changes associated with the transportation service, wherein each of the plurality of state changes is indicative of a progress of the transportation service, wherein monitoring the transportation service comprises obtaining data associated with a plurality of devices involved in the transportation service, wherein the plurality of devices comprise the user device, one or more ground vehicle service provider devices, one or more aerial vehicle service provider devices, and one or more facility devices, wherein each respective state change of the plurality of state changes is associated with one or more corresponding user interface states at one or more of the plurality of devices, wherein each respective user interface state corresponds to a user interface at a respective device of the plurality of devices, wherein monitoring the transportation service comprises:

determining, by the computing system, a state change of the plurality of state changes associated with the transportation service;

in response to the state change, adjusting, by the computing system, an aerial software application that runs on at least one aerial service provider device associated with the aerial service provider based at least in part on an aerial user interface state corresponding to the state change associated with the transportation service;

determining, by the computing system, a subsequent state change associated with the transportation service of the plurality of state changes associated with the transportation service, wherein the subsequent state change occurs after the state change associated with the transportation service;

determining, by the computing system, a ground vehicle service provider associated with at least one ground vehicle service provider device to provide ground transportation for the user during the third transportation leg based, at least in part, on the subsequent state change; and adjusting, by the computing system, a ground software application that runs on the at least one ground vehicle service provider device associated with the ground vehicle service provider based, at least in part, on a ground vehicle service provider user interface state corresponding to the subsequent state change associated with the transportation service, wherein the ground software application is adjusted to display an indication of an assignment of the user to the ground vehicle service provider through a vehicle service provider user interface of the ground software application;

determining a second subsequent state change associated with the transportation service of the plurality of state changes associated with the transportation service, wherein the second subsequent state change occurs after the state change and the subsequent state change; and in response to the second subsequent state change:

determining, based at least in part on the second subsequent state change associated with the transportation service, a destination greeter user interface state corresponding to the second subsequent state change for a destination greeter software application that runs on a destination greeter device associated with the destination facility, wherein the destination greeter user interface state comprises an indication that the aerial transport has arrived at the destination facility; and adjusting the destination greeter software application that runs on the greeter device based on the destination greeter user interface state, wherein the destination greeter software application is adjusted to display the indication of the assignment of the user to the ground vehicle service provider through a destination greeter user interface of the destination greeter software application.

\* \* \* \* \*